June 14, 1932.   H. G. W. BROWN   1,862,519
TIME OF DAY ANNOUNCING SYSTEM
Filed Jan. 12, 1931   12 Sheets-Sheet 1

INVENTOR
H.G.W. BROWN
BY P. C. Smith
ATTORNEY

June 14, 1932.  H. G. W. BROWN  1,862,519
TIME OF DAY ANNOUNCING SYSTEM
Filed Jan. 12, 1931   12 Sheets-Sheet 2

INVENTOR
H.G.W. BROWN
BY P. C. Smith
ATTORNEY

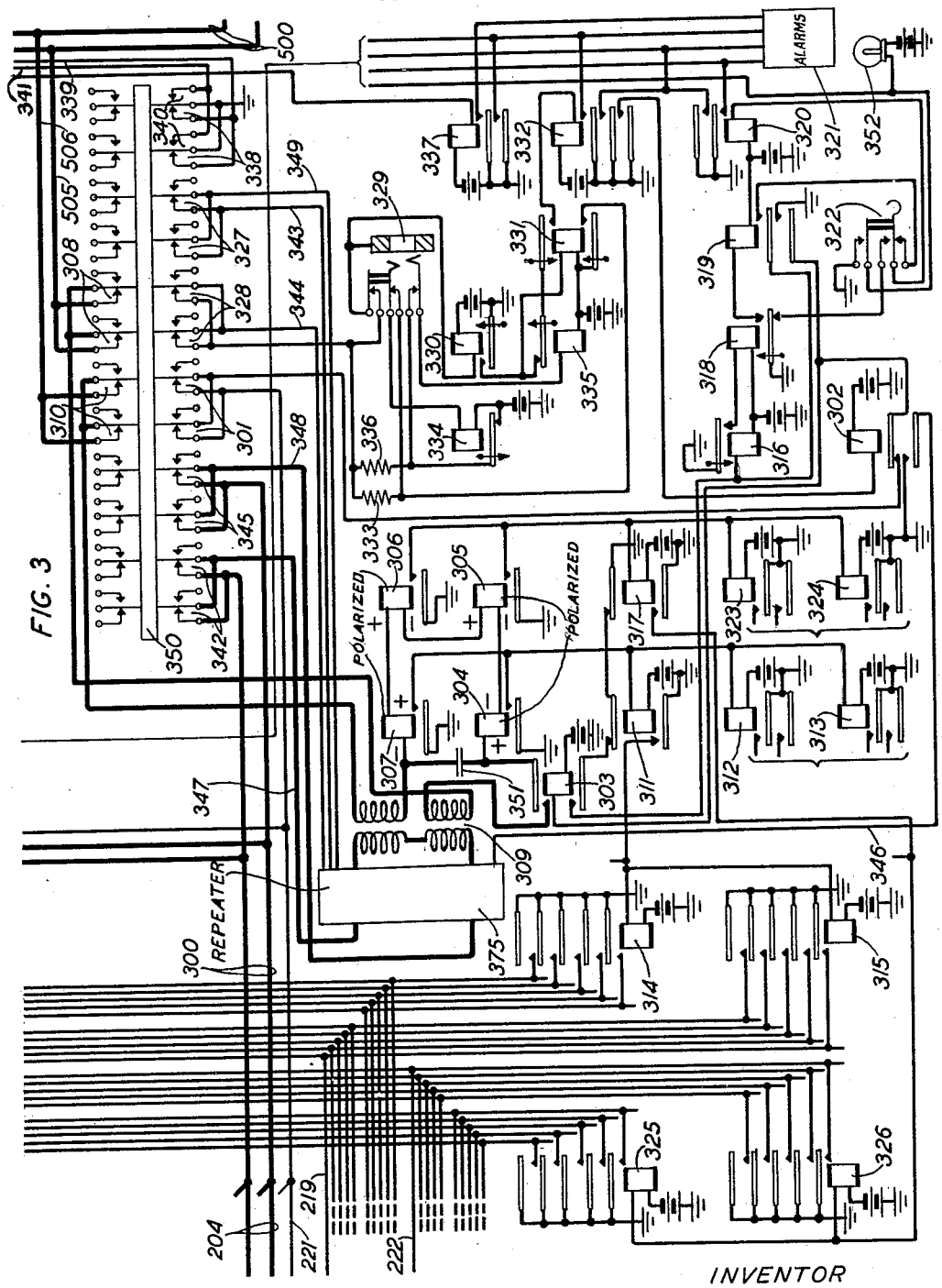

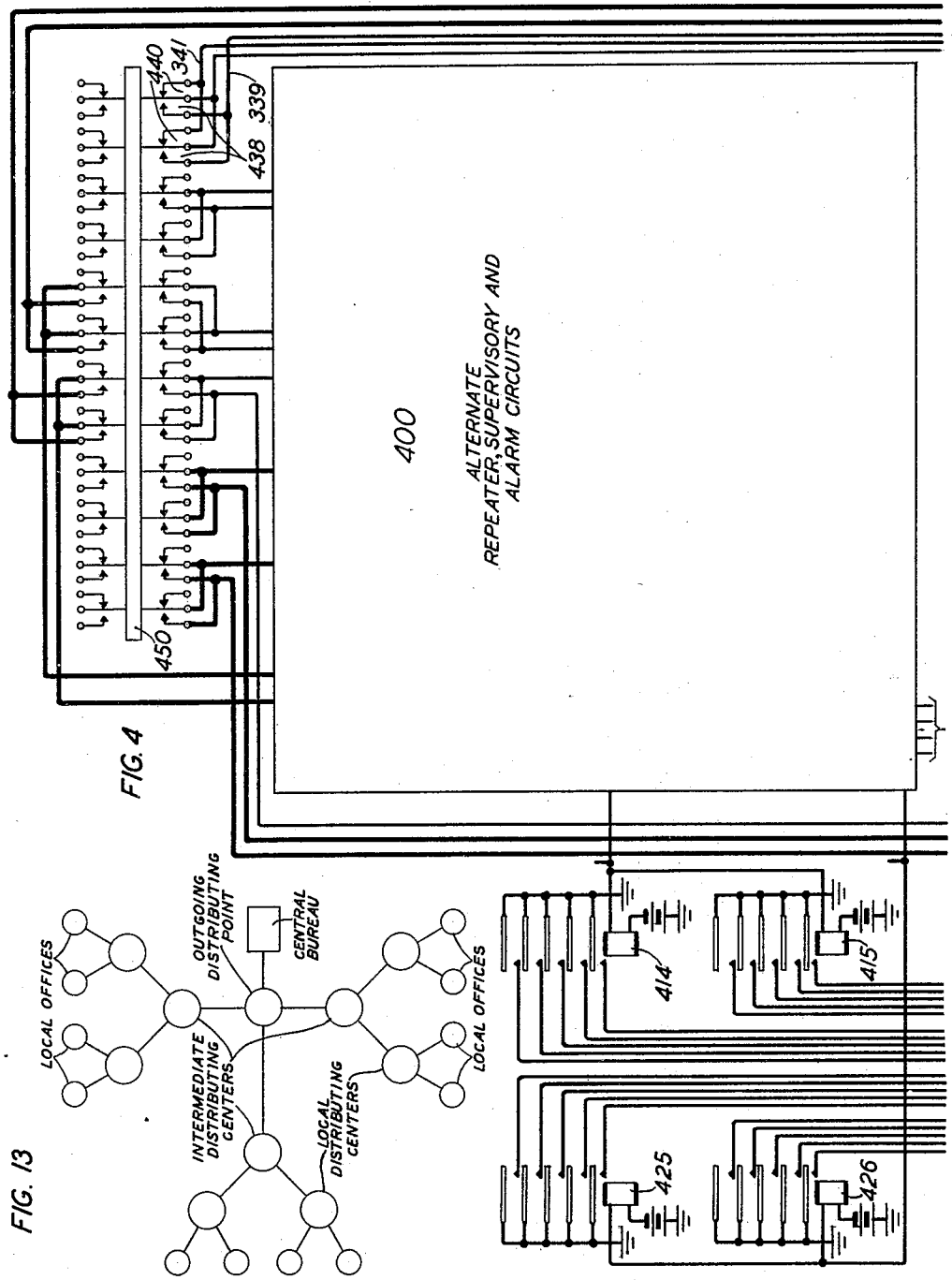

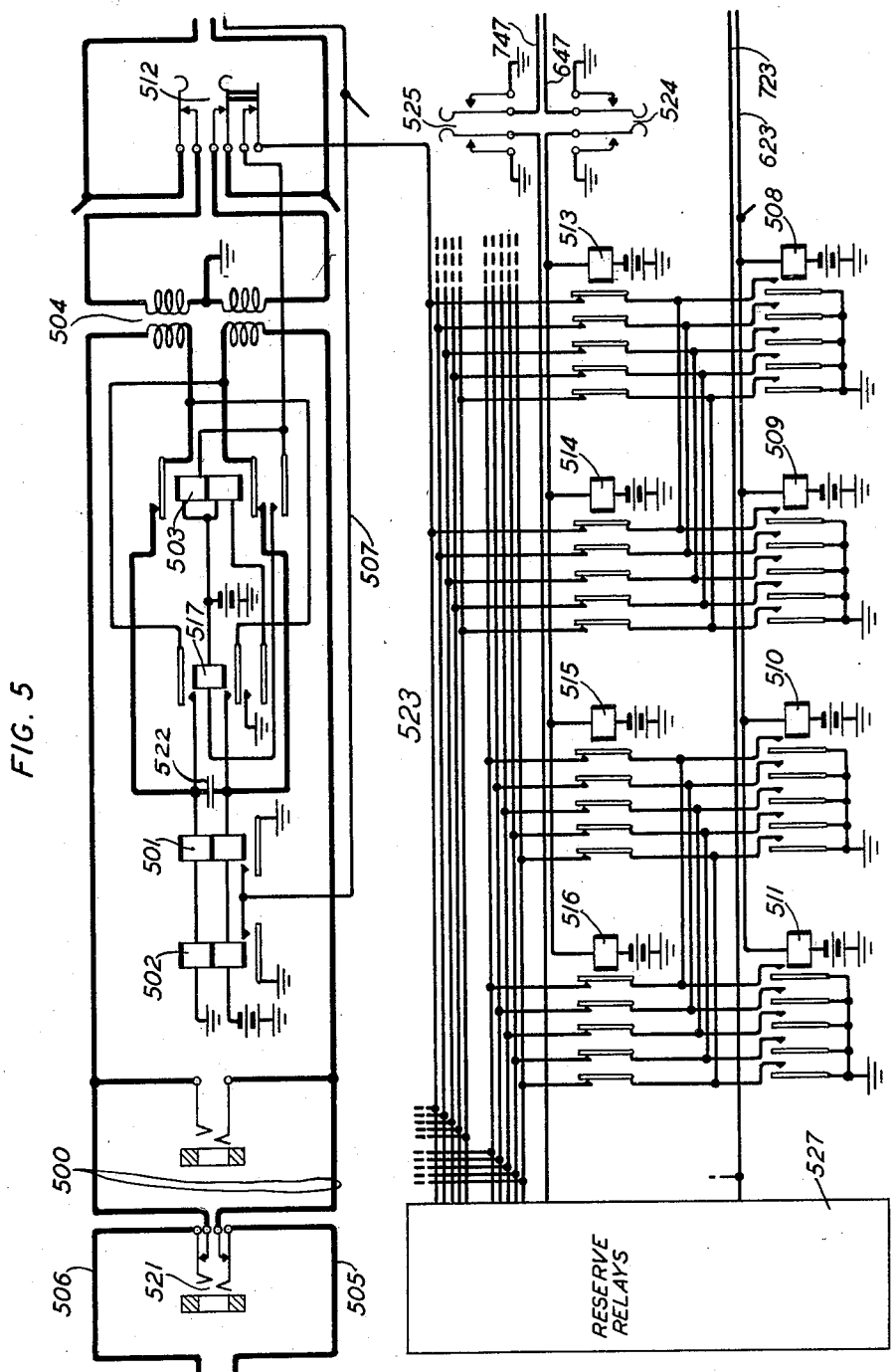

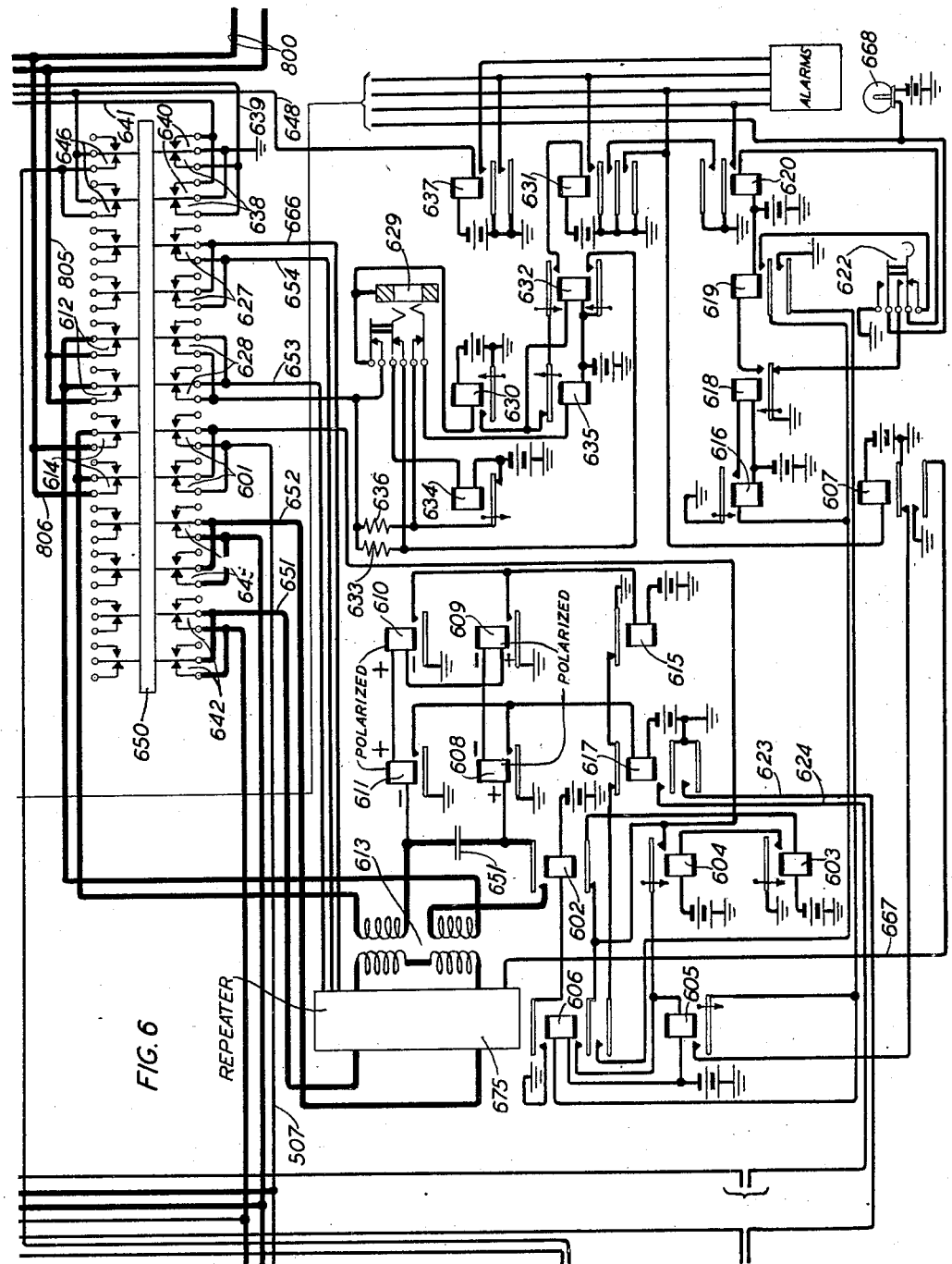

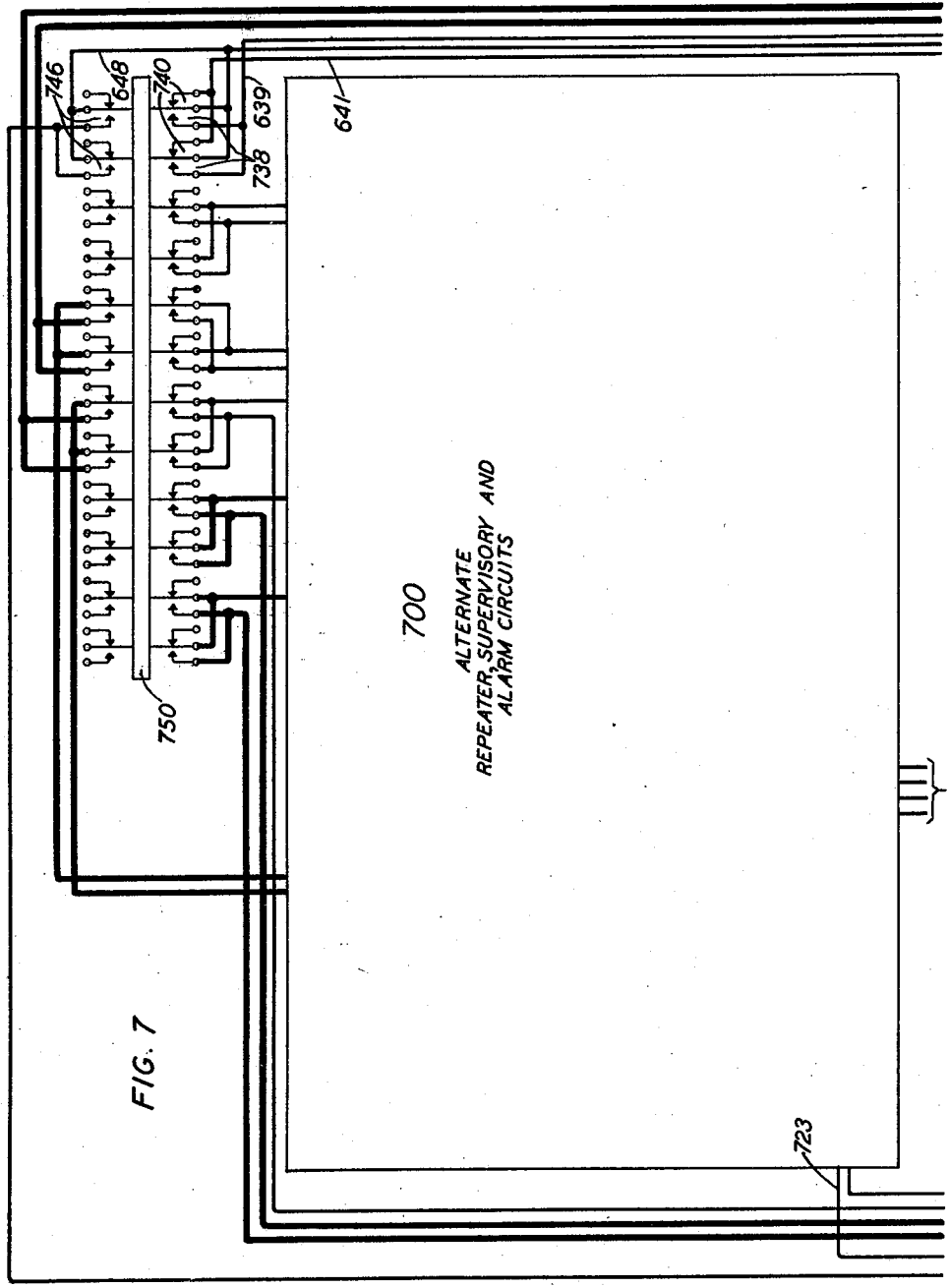

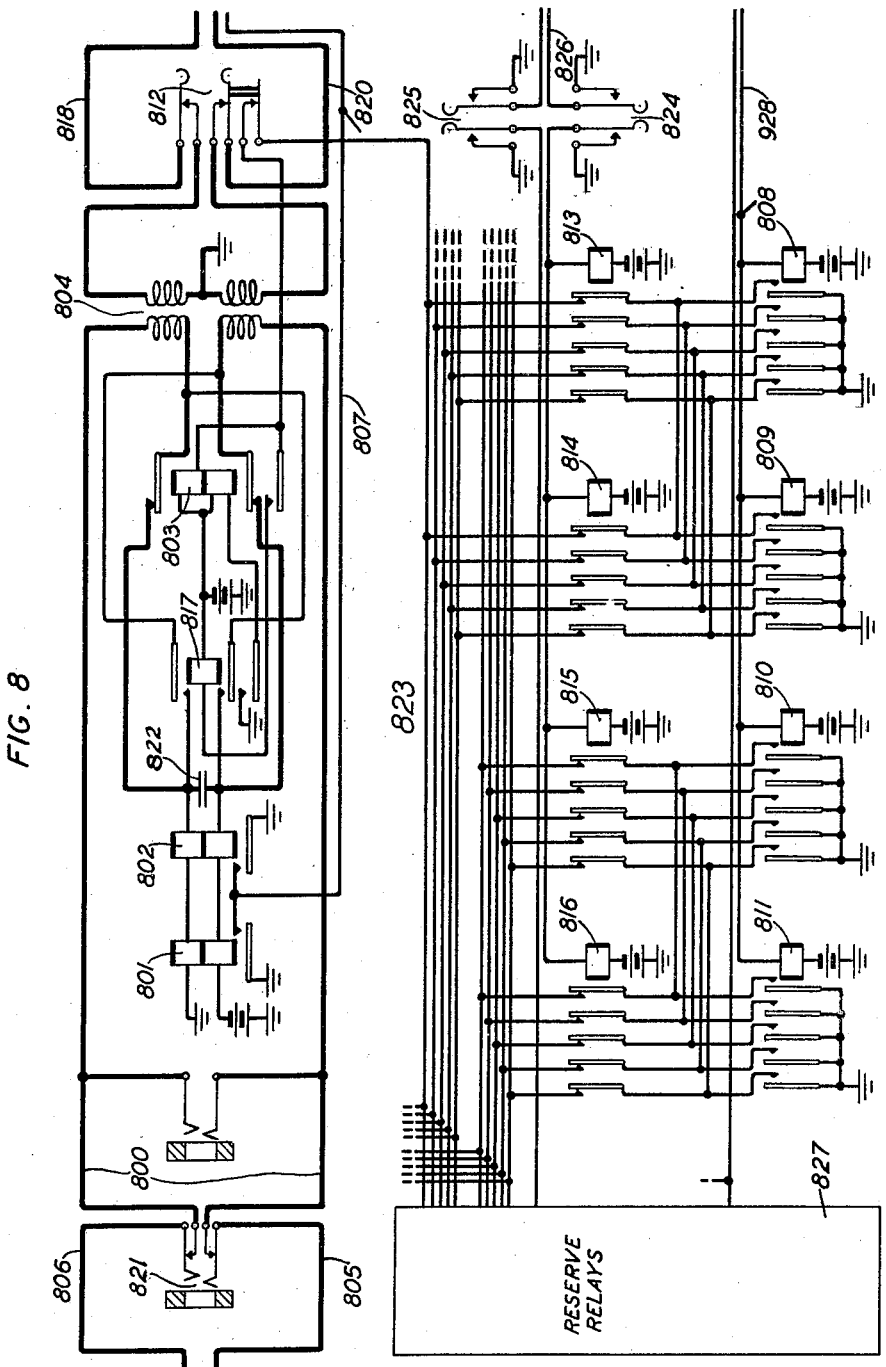

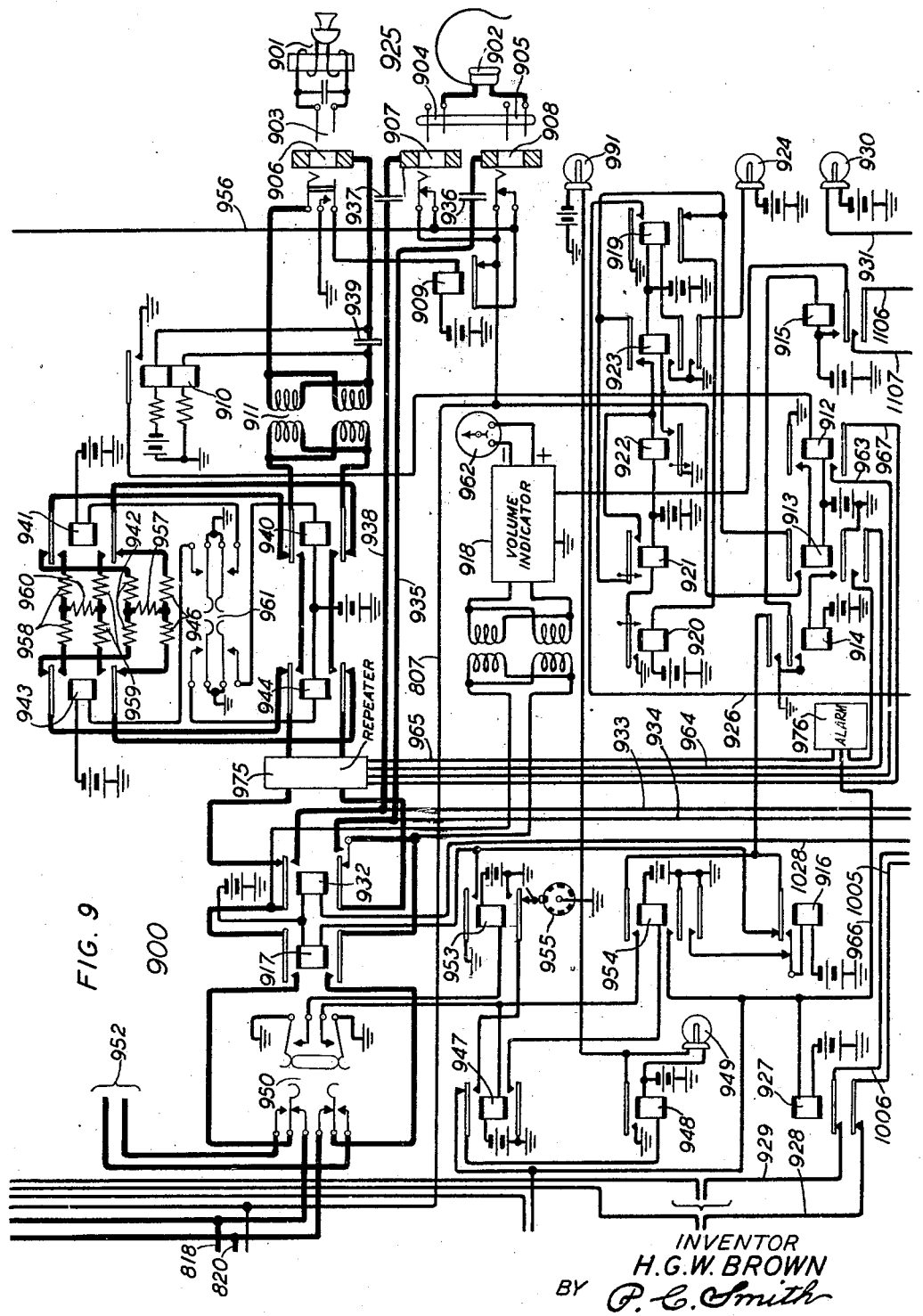

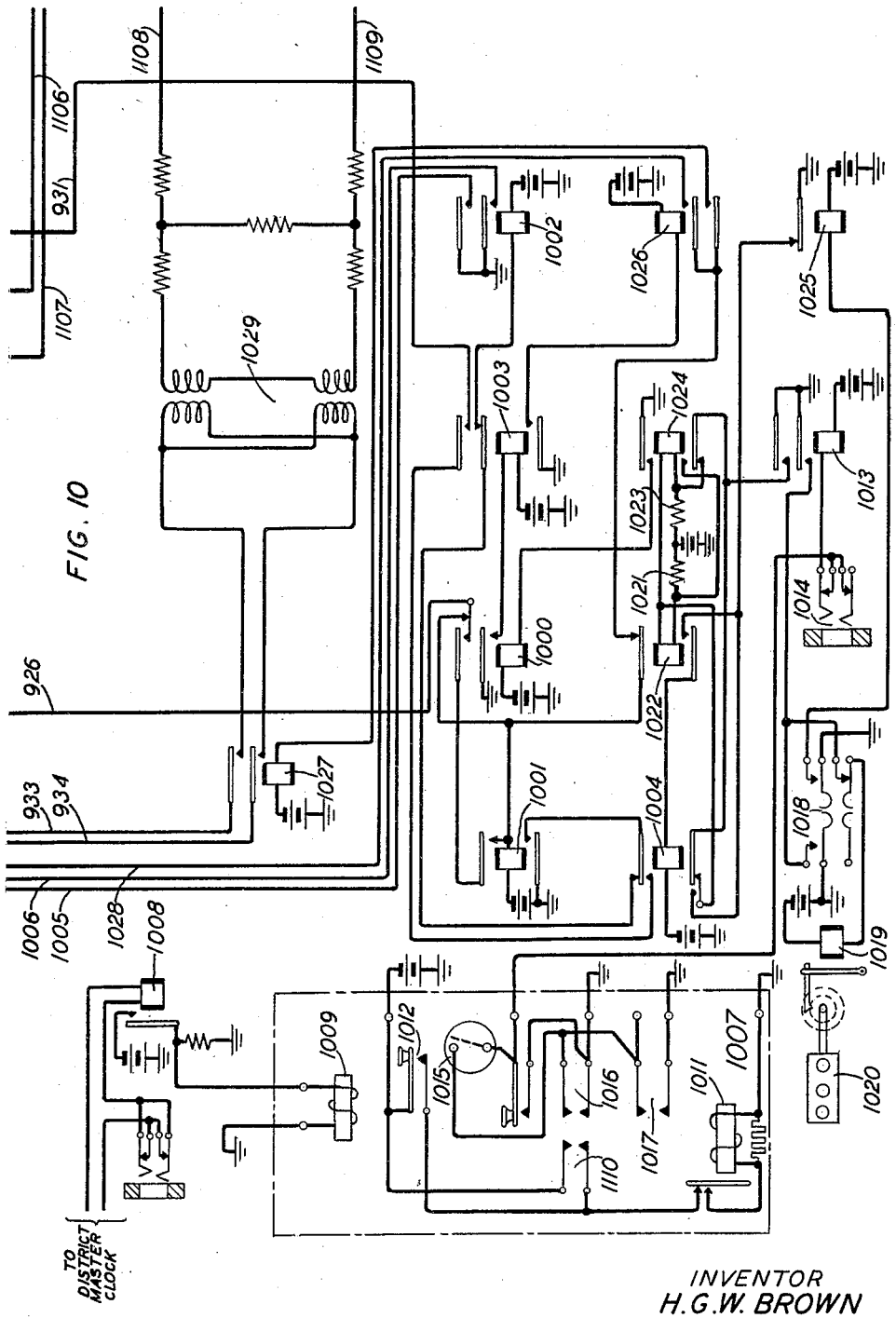

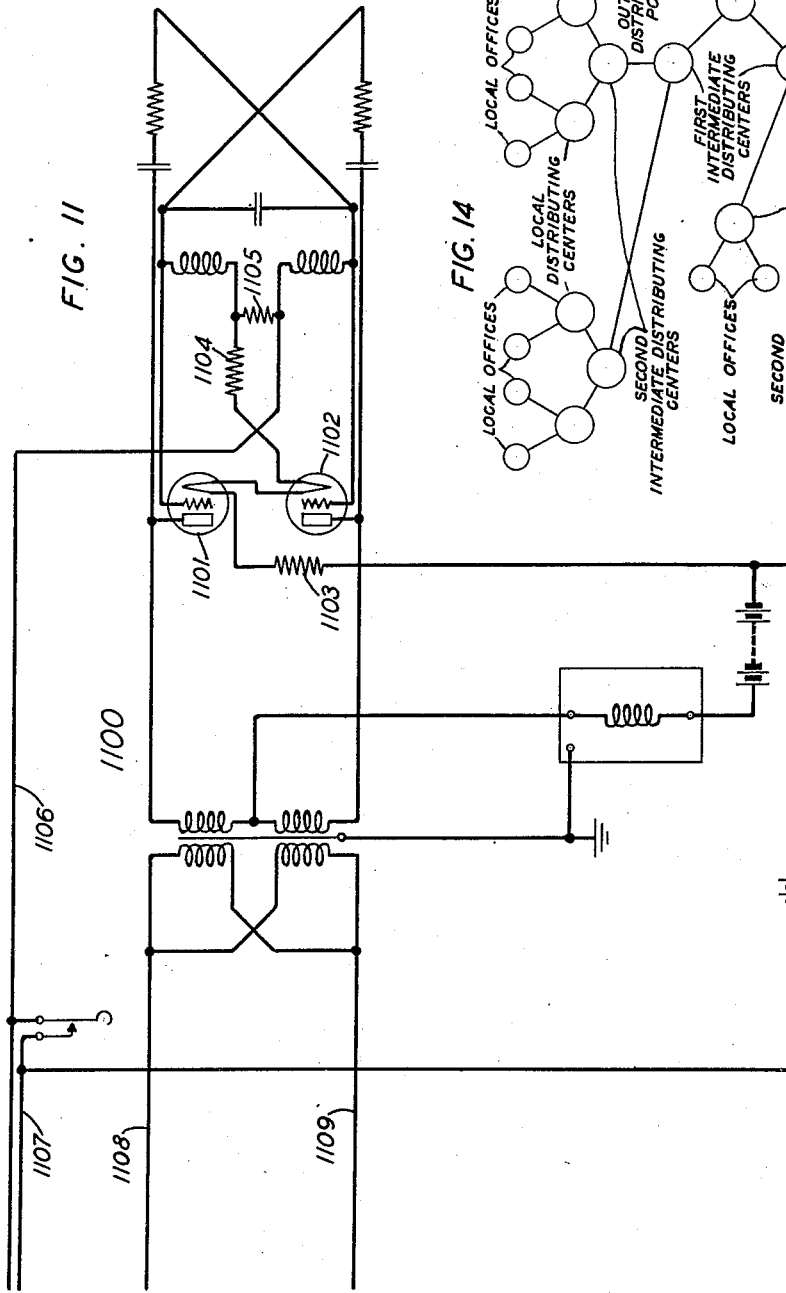

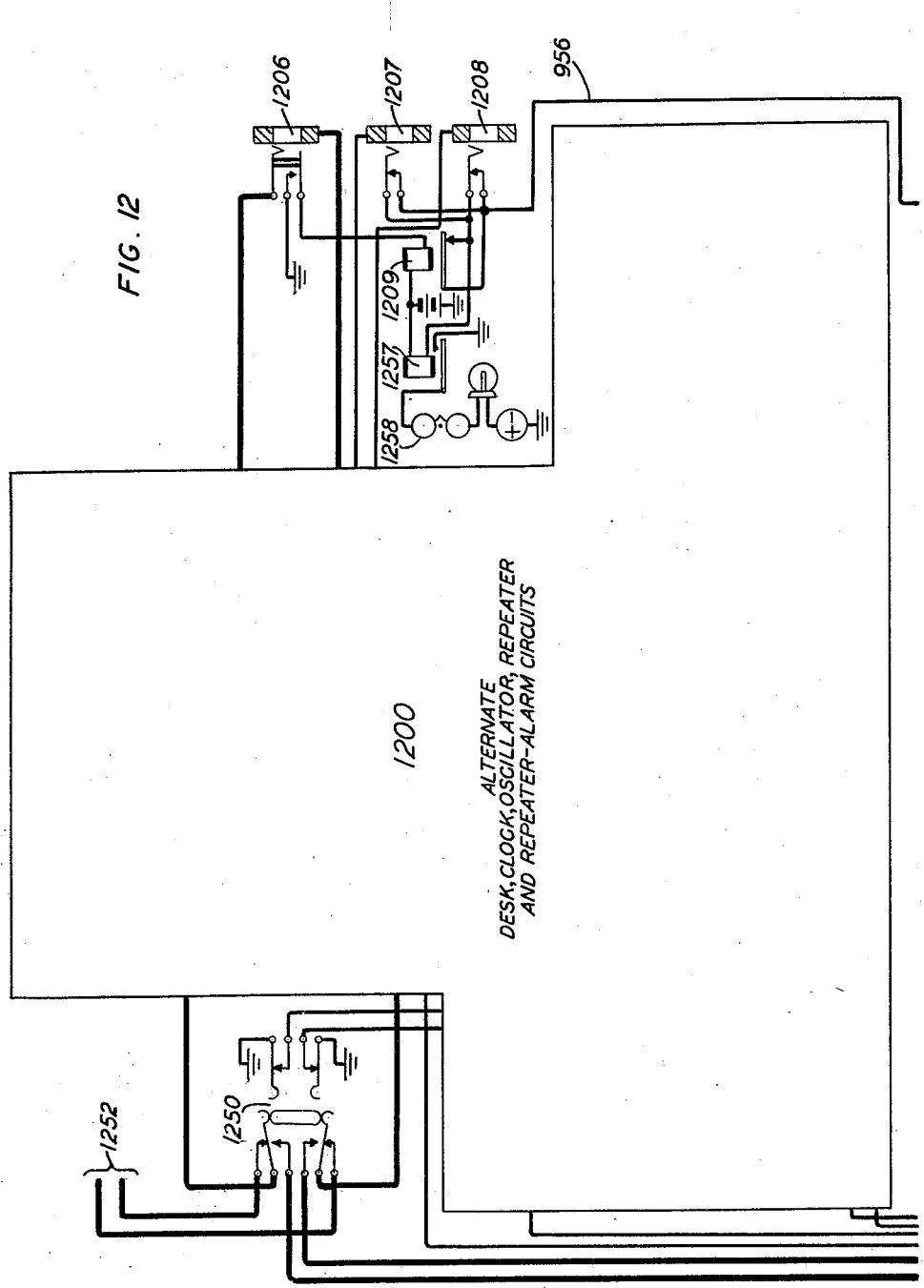

Patented June 14, 1932

1,862,519

UNITED STATES PATENT OFFICE

HORATIO G. W. BROWN, OF VALLEY STREAM, NEW YORK, ASSIGNOR TO BELL TELEPHONE LABORATORIES, INCORPORATED, OF NEW YORK, N. Y., A CORPORATION OF NEW YORK

TIME OF DAY ANNOUNCING SYSTEM

Application filed January 12, 1931. Serial No. 508,207.

This invention relates to telephone exchange systems and more particularly to systems in which a subscriber by calling a particular line designation either by dialing, as in machine switching systems or by the aid of an operator as in manual systems may obtain a connection with a central time announcing bureau from which at specified intervals announcements are made of the correct time of day. The object of the invention is to enable time of day announcements to be broadcast efficiently to as many subscribers in an exchange area or in a plurality of exchange areas as request the time of day at any period thereof.

Heretofore it has been proposed to provide a time announcing mechanism for an office in which a plurality of subscribers' lines terminate which may be automatically selected by any calling subscriber of the office through the dialing of a line designation set aside for that purpose. Upon the seizure of the announcing mechanism from one or a plurality of subscribers' lines the mechanism through phonographic means for example as is disclosed in Patent No. 1,227,523 granted to J. G. Blessing on March 22, 1917, or through photographic sound producing means for example as shown in Patent No. 1,618,242 granted to G. K. Thompson, February 22, 1927, transmit automatically to the subscribers' lines the hour and minute of the time of day.

It has also been proposed to provide a special operator's position in the exchange area which may be called either automatically or manually in the same manner as a local call would be made to another subscriber's line, the operator upon answering the call announcing to the calling subscriber the exact time of day.

Such systems when applied to a large exchange area require a plurality of time announcing bureaus to give adequate service and do not permit the centralization of the service in a single operator's position for enabling one operator to announce the time on all calls incoming from an extended area. In accordance with the present invention, one embodiment of which has been disclosed by way of example, a single time announcing bureau employing but a single operator may be reached from offices of exchanges within a large area. For example, a time announcing bureau located in New York city might be employed for serving all of the exchange areas surrounding New York city within a radius of 300 miles, the distant exchange areas being connected to the time bureau over long distance trunk lines set aside for that purpose. Thus when any subscriber in such an area desires the correct time it is only necessary for him to call a designated number, for example, Meridian 4000, whereupon if his line terminates in a manual exchange the operator will connect his line with a trunk extending directly or through a distributing center to the time announcing bureau or if his line terminates in a dial switching office he will upon dialing the designated number become connected by automatic selective switches with a trunk extending to the time bureau, either directly or through an intermediate distributing center.

By suitably fanning out the trunk line terminating in the time announcing bureau through intermediate and local distribution centers it is possible to enable the operator at the bureau to simultaneously announce the time to any number of subscribers in an extended area who may at any moment be connected to the bureau for the purpose of receiving such time announcement.

In general the system in accordance with the present invention functions as follows. It will be assumed, for example, that a subscriber whose line terminates in a dial switching office in Philadelphia desires the correct time and dials the designated number Meridian 4000. In response to dialing, selective switches in the local office at the Philadelphia exchange will establish a connection with a trunk terminating in a distribution center, local to the Philadelphia area and multipled with other trunks extending to other offices in the Philadelphia exchange and with other trunks extending to other exchanges in nearby communities to a trunk extending through an intermediate distributing center located for example in Trenton, New Jersey. This trunk at the Philadelphia distributing center would be provided with a one-way vacuum tube repeater for amplifying voice currents incoming thereto from the distributing center in Trenton. Also incoming to the distributing center in Trenton and multipled to the trunk extending to Philadelphia other trunks would be provided extending to local distributing centers located for example at Atlantic City, New Jersey, Easton, Pennsylvania etc. From this intermediate distributing center the multipled trunk would extend as a single trunk through a vacuum tube repeater to an outgoing distributing circuit in New York city and thence to the central bureau also equipped with a repeater. Thus the Philadelphia subscriber by dialing the designated number becomes connected over the trunk network directly with the central bureau. At this time many other subscribers located in the areas surrounding the local distribution center in Philadelphia, Atlantic City, Easton, Pennsylvania etc. may be in direct connection with the central time bureau in New York city. Also from the outgoing distributing circuit in New York city other trunk networks may extend northward through intermediate distributing centers for serving northern New York and eastward for serving New England. Indeed it is conceivable that with a single central time bureau located at some central point along the eastern seaboard the entire eastern time zone might be served.

It is of course obvious that the system according to the present invention might be used to give service locally to a large metropolitan area such as New York city. In that case the offices of the area would be grouped according to their location in the area into sections, each section being served by a local distributing center, the local distributing centers being connected by trunks extending either directly to an outgoing distributing point associated with a centrally located bureau, or to the bureau through intermediate distributing centers.

At the time bureau whenever a call or any number of simultaneous calls are incoming over the trunk line or lines terminating therein, a calling lamp signal is given to the operator to advise her of the fact and a circuit is established which is effective, in combination with a clock circuit associated with the operator's desk, during a 7½ second interval prior to the next time announcement period, to cut through the circuits extending from the calling lines that may be at the time connected to the central bureau preparatory to transmitting the announcement. The clock circuit is arranged to indicate the hours, minutes and quarter minutes and just prior to the next quarter minute period following the receipt of an incoming call the operator is signalled to announce the time indicated by the clock. She then announces the time, for example, by saying "When you hear the tone signal it will be exactly five and three quarter minutes after five o'clock." When this exact time is reached the clock circuit extinguishes the signal and transmits a tone signal to subscribers' lines which are connected to the central bureau. In this manner the operator announces the time at one quarter minute intervals as long as the calling lamp at her position remains lighted.

In accordance with the present invention, provision is made at the outgoing distributing circuit of the central time bureau, at intermediate distributing centers and at local distributing centers for fanning out a connection from the central time announcing bureau to trunk circuits local to local offices which are entitled to time of day service and for passing supervisory signals toward and from the central bureau through such distributing centers. Provision is also made at each distributing center for duplicating apparatus thereat to insure against failure of the time of day service and to operate suitable alarm signals when apparatus fails and should be removed from service.

Other features disclosed and described herein have been made the basis of other co-pending applications filed concurrently herewith. These applications are the application of R. F. Massonneau, Serial No. 508,209, the application of W. B. Prince, Serial No. 508,208 and the joint application of C. W. Keckler and A. E. Hague, Serial No. 508,211.

A clearer conception of the scope and purpose of the invention will be obtained from a consideration of the following description taken in connection with the attached drawings in which:

Fig. 1 shows the line of a subscriber A terminating in an originating office of an exchange area, the schematic representation of a line finder, a link circuit having a line finder selector and sender selector by means of which the line may become associated with a central office register sender, such portions of a register sender shown in the lower portion of Fig. 1 as are necessary to an understanding of the invention and the schematic representation of a district selector and office selector by means of which the line may be further extended;

Fig. 2 shows an outgoing trunk extending to a local distributing center, Fig. 3;

Figs. 3 and 4 taken together, show apparatus at a local distributing center, Fig. 3 showing an extension of the trunk of Fig. 2 extending over a two wire trunk to the intermediate distributing center of Fig. 5 and at the left portion of the figure the supervisory circuits of other trunks similar to the trunks of Fig. 2 which are also multipled to the trunks of Fig. 3, and Fig. 4 showing schematically alternate repeater, supervisory and alarm circuits which may be used in place of similar circuits shown in Fig. 3;

Figs. 5, 6 and 7 taken together show apparatus at an intermediate distributing center. Fig. 5 shows the other end of the trunk extending to the local distributing center of Figs. 3 and 4 and apparatus of an intermediate distributing center; Fig. 6 shows an extension of the trunk of Fig. 5 together with the supervisory and alarm circuits thereof; Fig. 7 shows schematically alternate supervisory, repeater and alarm circuits which may be used in place of similar circuits shown in Fig. 6; Fig. 8 shows the other end of the trunk extending to the intermediate distributing center of Figs. 5 to 7 inclusive, and apparatus of an outgoing distributing point.

Figs. 9 to 12 inclusive taken together show apparatus at a central time announcing bureau. Fig. 9 shows one desk circuit at the central bureau; Fig. 10 shows the clock circuit and Fig. 11 shows an oscillator circuit, the circuits of Figs. 10 and 11 being individual to the desk circuit of Fig. 9. Fig. 12 shows schematically an alternate desk and associated circuits which may be used in place of the similar circuits of Figs. 9 to 11 inclusive;

Fig. 13 is a diagram showing schematically the arrangement of trunking facilities for connecting a plurality of offices through local and intermediate distributing centers and an outgoing distributing point with a central time announcing bureau;

Fig. 14 is a diagram showing schematically an arrangement of trunking facilities similar to those of Fig. 13 but providing for serving a larger area through first and second intermediate distributing centers;

Fig. 15 is a diagram showing how Figs. 1 to 12 inclusive should be assembled to disclose the detailed circuits of the invention.

*General description of the invention*

By referring to Fig. 13 a general comprehension of the scope and purpose of the invention may be obtained. As previously stated, the time of day announcing system in accordance with the present invention contemplates the establishment of a central bureau at which is positioned a special operator who, when demand arises, periodically announces the exact time within the nearest quarter minute. Obviously, if required, such operator could be provided with facilities for announcing the time within closer limits, as for example, to the nearest tenth of a minute. It is intended that the central bureau shall be accessible from a plurality of offices of an exchange area over a special trunk network fanned out from such bureau. To facilitate the interconnection of subscribers whose lines terminate in exchange offices of an area to be served by the central bureau with the central bureau the exchanges or offices of the area are divided into sections all offices of a particular section having access to a local distributing center. From the local distributing centers of a plurality of sections, trunks extend as schematically disclosed in Fig. 13 to an intermediate distributing center. Thus, each intermediate distributing center is accessible from a plurality of local distributing centers and from the offices which have access to each local distributing center. As many intermediate distributing centers would be provided as would be necessary to handle the traffic from the different sections of the area.

All of the intermediate distributing centers, in turn, are connected by trunks to an outgoing distributing point located contiguous to the central bureau, at which bureau the trunks incoming to the outgoing distributing point are connected to the desk circuit of the announcing operator. While the invention has been disclosed as applied to a system in which all sections of the area may be served through a single group of intermediate distributing centers, as disclosed diagrammatically in Fig. 13, it will be obvious that secondary distributing centers or indeed tertiary distributing centers could be established as disclosed diagrammatically in Fig. 14. Should the area to be served be not extensive, then the intermediate distributing centers could be omitted and trunks could be extended directly from the outgoing distributing point to the local distributing centers.

Figure 1:
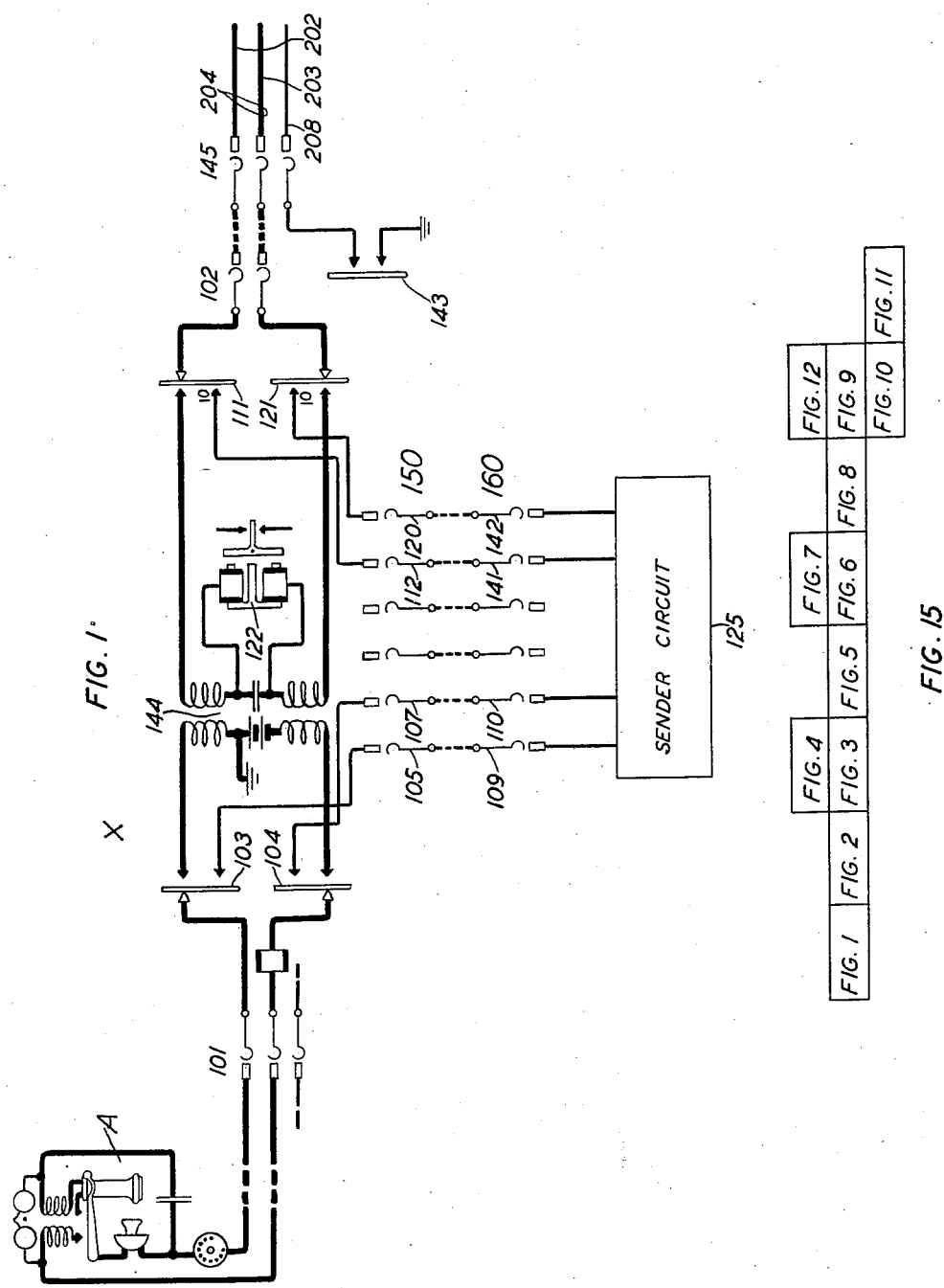

The apparatus of the originating office shown in Fig. 1 is of the well known panel type. The line finder 101, selector switches 102 and 145 and the link circuit of Fig. 1 may be of the same type and function in the same manner as the similar apparatus disclosed and described in Patent No. 1,690,206 issued to A. Raynsford on November 6, 1928. The sender may be of the same type as disclosed in Patent No. 1,505,171 issued to F. A. Stearn, August 19, 1924. Only such portions of these switches, link circuit and sender have been disclosed herein as are considered necessary to an understanding of the invention, reference being made herein to the above identified patents for a full detailed disclosure.

The repeaters 375, 675 and 975 shown diagrammatically by the rectangles in Figs. 3, 6 and 9 may be of the same type as disclosed in detail in Figs. 3, 7 and 12 of the application of R. F. Massonneau above referred to. The repeater alarm circuit indicated by the small rectangle 976 in the lower central portion of Fig. 9 may likewise be the same as the repeater alarm circuit shown in the Massonneau application.

In Fig. 3 the trunks outgoing from bank terminals of selectors such as 145 of the dial switching office X are shown multipled together and connected at the local distributing center in the section of the area in which the office X is located, to a trunk 300 in which either the repeater 375 or the repeater 400 may be inserted by the operation of either switch 350 or switch 450. Other offices similar to office X may also have outgoing trunks terminating in the local distributing center and multipled to trunk 300. The repeaters 375 and 400 are arranged to transmit voice currents in one direction only, that is, from the central bureau towards the calling lines in offices such as X. From the input side of repeaters 375 and 400, a trunk 500 extends through the intermediate distributing center of Figs. 5, 6 and 7. This trunk is also multipled as indicated at the right of Fig. 5 to similar trunks which extend to other local distributing centers such as is shown in Figs. 3 and 4, and the extension of these trunks extends through either repeater 675 or 700 to a trunk 800. Either repeater 675 or 700 may be inserted between the trunks 500 and 800 through the operation of switch 650 or switch 750. The trunk 800 is multipled at the outgoing distributing point to other similar trunks which extend to other intermediate distributing centers and the extension of these multipled trunks extends to the central bureau desk circuit 900 through contacts of key 950. An alternate desk circuit 1200 may be connected to the extended trunk circuit in place of desk circuit 900 by the operation of key 1250 to the right and the operation of key 950 to the left. Whenever a desk circuit is removed from service by the maintenance man through the operation of the associated key 950 or 1250 it becomes connected to test line 952 or line 1252 extending to the maintenance man's test position. An operator's transmitter 901 and receiver 902 may be connected to either desk circuit by plug and jack connections.

*Initiation of a call*

With this general outline in mind the invention will now be considered in more detail. Assume that a subscriber A whose line terminates in office X initiates a call to obtain the correct time. The subscriber A upon removing his receiver from the switchhook causes the setting of the brushes of the line finder 101 upon the terminals of the calling line and the extension of circuits from the calling line and district selector 102 over wipers of the link circuit line finder selector 150 and sender selector 160 to an idle sender 125. It will be further assumed that the sender shown in the lower portion of Fig. 1 is idle and becomes associated with the calling line, whereupon a pulsing circuit is established in the well known manner from the pulsing relay of the sender 125, wiper 110, wiper 107, the upper right contact of cam 104, the lower brush of line finder 101 over the subscriber's line loop returning over the upper brush of line finder 101, the lower contact of cam 103, wiper 105, wiper 109 to ground at the sender. As soon as this pulsing circuit is established the calling subscriber receives the usual dial tone and proceeds to dial the digits of the central time bureau designation which, it will be assumed, is MER–4000 thereby setting the registers of the sender to record the office and line designations of the central time bureau number.

As soon as the idle sender becomes associated with the district selector, the sequence switch associated with the district selector 102 advances to position 3 establishing the usual fundamental circuit from the control relay (not shown) at the district selector 102 through the winding of the sender stepping relay. Under the control of the office code registers of the sender, the district selector 102 is controlled in the well known manner to select a trunk group extending to office selectors. Following the selection of the proper trunk group, the district selector 102 functions to select an idle office selector in the group such as the one indicated at 145. As soon as the district selector terminates its trunk hunting operation the sequence switch associated therewith advances in the well known manner to position 10 whereby a fundamental circuit is established over the conductors of the selected trunk for controlling the office selector 145.

This fundamental circuit may be traced from battery through the winding of the control relay (not shown) of the office selector 145, upper brush of switch 102, lower contact of cam 111, wiper 112, wiper 141, winding of the sender stepping relay (not shown), wiper 142, wiper 120, upper contact of cam 121, lower brush of selector switch 102, to ground at the office selector.

The stepping relay of the sender and the control relay of the office selector 145 operate in this circuit, the office selector being controlled in the well known manner under the control of the sender in its brush and group selection movements to select an idle trunk such as 204 extending to the local distributing center. For calls to the central time bureau the office code registered in the sender sets up a class of call condition in the sender in the same manner as would be the case if a call were to be made to a manual office having call indicator equipment.

Following the seizure of trunk 204, a control circuit is established from the sender to the control relay 205 of trunk 204 which may be traced from battery through the upper winding of relay 205, upper back contact of relay 207, tip conductor 202 of trunk 204, tip brushes of switches 145 and 102, lower contact of cam 111, wipers 112 and 141, winding of the sender stepping relay, wipers 142 and 120, ring brushes of switches 102 and 145, ring conductor 203 of trunk 204, inner upper back contact of relay 207 to ground through the lower winding of relay 205. Relay 205 energizes in this circuit.

Relay 205 upon operating connects ground from cam 143 in the office selector 145 over the sleeve brush of selector 145, sleeve conductor 208 of trunk 204, front contact of relay 205, to the middle spring of interrupter 210. As soon as interrupter 210 makes its right contact the ground on conductor 208 is extended through the winding of sleeve relay 211 which operates and locks directly to sleeve conductor 208, connects ground at its inner lower front contact to the start conductor 221 and establishes a circuit for the peg count register over its lowermost front contact, the lower back contact of relay 207, the inner lower normal contacts of relay 212 to ground at the next to lower front contact of relay 211. After an interval sufficient to permit the sender to make the usual trunk guard test and to permit the operation of the peg count register, interrupter 210 closes its left contact establishing a circuit for relay 207 from battery through the upper winding of relay 207, the lower back contact of relay 206, the upper front contact of relay 211, left contact of interrupter 210, to ground on conductor 208. Relay 207 upon operating locks over its upper winding, the lower back contact of relay 206, the lower front contact of relay 207, to ground at the next to inner lower front contact of relay 211, opens the circuit of the peg count register, disconnects the windings of relay 205 from the tip and ring conductors of trunk 204 and connects these conductors in a dry bridge including the winding of polarized relay 225. This circuit may be traced from the tip conductor 202 of trunk 204, upper front contact of relay 207, upper back contact of relay 212, winding of polarized relay 225, inner upper back contact of relay 212, inner upper front contact of relay 207, to ring conductor 203 of trunk 204.

Figure 2:
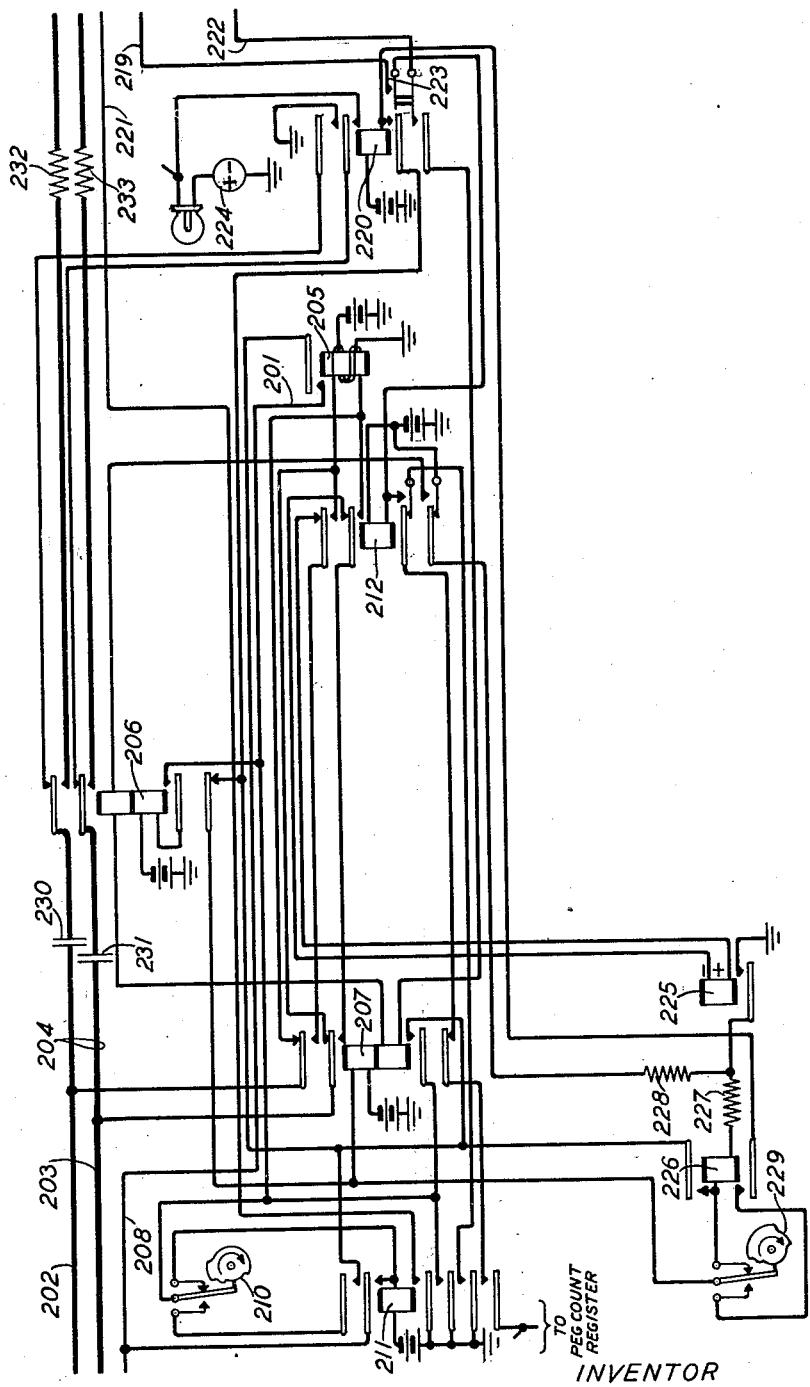

Relay 205 releases without affecting the circuits now established and at the sender a circuit is closed as fully set forth in the patent to F. A. Stearn through the magnet winding of the code impulser switch for advancing the impulser switch out of position 1 through a single revolution. As it passes through a complete revolution, the impulser switch transmits a plurality of series of code impulses to the trunk circuit of Fig. 2 in the well known manner, a series being transmitted for each digit of the central bureau designation 4000.

The circuit over which the code impulses are transmitted may be traced in part from the sender 125 over wipers 141 and 112, thence as previously traced through the winding of polarized relay 225 of trunk circuit 204, returning over wipers 120 and 142, to the sender. The impulses of each series may consist in the usual manner of light positive and light or heavy negative impulses. The polarized relay 225 which is included in the impulsing circuit responds only to the negative impulses. When the impulser switch of the sender advances, transmitting the usual negative impulses of current, the polarized relay 225 will respond to each such negative impulse. When relay 207 operated it closed a circuit for relay 226 extending from battery over the lowermost normal contacts of relay 212, resistances 228 and 227, winding of relay 226, right contacts of interrupter 229, lower back contact of relay 206, inner lower front contact of relay 207 to ground at a front contact of relay 211. Relay 226 locks over its upper front contact and the inner lower front contact of relay 207 to ground but is not effective to cause the operation of relay 220 during the transmission of code impulses because before interrupter 229 advances to close its left contact to complete the circuit of relay 220, over the lower contacts of relay 226, polarized relay 225 will respond to a negative code impulse and shunt relay 226 to cause its release. Thus during the transmission of the code impulses relay 225 in responding to each negative impulse will shunt relay 226 and since these negative impulses arrive periodically at intervals less than the interval required for interrupter 229 to complete a cycle, relay 226 cannot establish the circuit of relay 220.

Upon the completion of the transmission of the code impulses, however, relay 225 will receive no more negative impulses and will remain deenergized thereby permitting relay 226 to reenergize and remain operated during a complete cycle of interrupter 229, whereupon the circuit of relay 220 will be closed from battery through the winding of relay 220, lower front contact of relay 226, left contacts of interrupter 229, lower back contact of relay 206, inner lower front contact of relay 207 to ground at a contact of relay 211.

Relay 220 upon operating locks over its inner lower front contacts, inner lower front contacts of relay 207, to ground at relay 211 and connects ringing tone from the source of ringing current 224 over the inner upper front contact of relay 220, inner upper back contact of relay 206, trunk conductor 203, ring brushes of switches 145 and 102, lower contact of cam 121, right windings of repeating coil 144, upper contacts of cam 111, brushes of switches 102 and 145, trunk conductor 202, upper back contact of relay 206, to ground at the uppermost front contact of relay 220. Ringing tone current is thereupon induced over the calling line loop through the left windings of repeating coil 144 in an obvious manner, as a signal to the calling subscriber that a connection has become extended from his line to the transmission network. Relay 220 at its contacts 223 also extends conductor 219 to the winding of pick-up relay 212 and extends conductor 222 over its lower front contacts through the lower winding of relay 207 and the upper winding of cut through relay 206. The circuits over conductors 219 and 222 are closed in a manner hereinafter described.

The sender is advanced to the talking selection position following the transmission of the code impulses in turn advancing the district selector sequence switch to the talking position and itself becoming disconnected from the established connection and restored to normal condition.

It will be recalled that when the trunk 204 was first seized, relay 211 operated and connected ground to start conductor 221. A start circuit was thus closed from ground on start conductor 221, normal contacts 301 of switch 350, back contact of relay 302 to battery through the winding of start relay 303 at the local distributing center. Relay 303 operates and connects the polarized relays 304 to 307 inclusive to the conductors of trunk 500 in series with the windings of relays 501 and 502 at the intermediate distributing center. The circuit thus established may be traced from battery through the lower windings of relays 501 and 502, the lower back contact of relay 503, the lower left winding of repeating coil 504, lower contacts of jack 521, conductor 505 of trunk 500, contacts 308 of switch 350, lower right winding of repeating coil 309, upper contact of relay 303, winding of relays 304 to 307 inclusive, upper right winding of coil 309, contacts 310 of switch 350, conductor 506 of trunk 500, upper contacts of jack 521, upper left winding of repeating coil 504, upper back contact of relay 503 to ground through the upper windings of relays 502 and 501. Relays 304 and 307 are so polarized that they operate in this circuit but relays 305 and 306 being oppositely polarized, do not operate. Relays 501 and 502 also operate to perform functions to be described hereinafter. Relays 304 and 307 upon operating establish obvious circuits for relays 311, 312 and 313. It is to be noted in this connection that the start conductor 221 is multipled to all trunk circuits such as 204 extending from the several offices having access to the local distributing center disclosed in Figs. 3 and 4, so that when any subscriber in such offices initiates a call for time of day service, the start relay 303 will be operated.

Relay 311 upon operating closes obvious circuits for relays 314 and 315. Relays 312 and 313 also close circuits for other relays similar to relays 314 and 315. Since it is possible to operate four relays similar to relays 314 and 315 over each grounded contact of relays 311, 312 and 313, it is possible to thus operate twenty relays, and since each relay such as 315 is capable when operated of connecting ground to five conductors such as 219, the operation of polarized relays 304 and 307 may thus control the grounding of one hundred conductors 219 of one hundred trunks 204. When conductor 219 of trunk 204 is grounded through the operation of relay 315, the circuit of pick-up relay 212 is completed and relay 212 operates and locks from battery through its winding and inner lower alternate contacts to ground at the next to lower front contact of relay 211. At its lowermost normal contacts, relay 212 opens the circuit of relay 226, and at its lower alternate contacts, prepares a circuit for cut through relay 206 which will be described later. With relay 212 operated, battery and ground through the windings of relay 205 are connected in series with the windings of polarized relay 122 in the district selector 102 to operate relay 122 for call charging purposes. Similarly, the pick-up relay 212 of all trunks which have been seized for use by other subscribers in offices connected to the local distributing center are simultaneously operated through the operation of relays 214, 215 etc.

*Operation of line-in-trouble alarm*

Should the trunk circuit 500 be in trouble so that when the start relay 303 connects the relays 304 to 307 inclusive thereto, relays 304 and 307 do not operate and consequently relay 311 does not operate, a circuit is established for operating slow-to-operate relay 316 extending from battery, winding of relay 316, lower contact of relay 303, back contact of relay 311, back contact of relay 317 to ground. Relay 316 operates, causing slow-to-operate relay 318 and relays 319 and 320 to operate in turn. Relay 319 connects holding ground to the winding of start relay 303 to hold it operated until the trouble condition is removed, and relay 320 grounds conductors extending to the alarm board shown diagrammatically by the rectangle 321. This alarm device may comprise suitable lamps or signal devices for indicating to a maintenance man that a trouble condition exists on the trunk line.

In response to the alarm signals, the maintenance man depresses the key 322, thus releasing relay 320 which opens the circuit of the alarm signals and establishes over the upper contact of key 322 a circuit for a guard lamp 352 on the alarm board 321. When the trouble condition is removed, relay 316 releases, in turn releasing relays 318 and 319. Relay 320 reoperates from ground at the back contact of relay 318 over the lower alternate contacts of key 322, causing the alarm signals to be reoperated. Since the guard lamp 352 is at this time lighted, the reoperation of the alarm signals indicates to the maintenance man that the trouble has been cleared, whereupon he releases key 322 extinguishing the guard lamp and releasing relay 320.

*Start circuit extended to intermediate distributing center*

When relays 501 and 502 at the intermediate distributing center, Figs. 5 to 7 inclusive, operate as previously described, a start circuit is established from ground at the contacts of these relays over conductor 507 which is multipled to other start conductors controlled by similar relays 501 and 502 in trunks similar to trunk 500 incoming from other local distributing centers such as is shown in Figs. 3 and 4, normal contacts 601 of switch 650, back contact of relay 602 to battery through the winding of relay 603. Relay 603 which is slow to operate energizes, in turn closing an obvious circuit for slow-to-operate relay 604. Relay 604 connects the start conductor 507 to the winding of slow-to-bridges relays 608 to 611 inclusive across the relay 606 to operate over a circuit from battery, winding of relay 606, contacts of relay 605 to ground at the back contact of relay 607. Relay 606 upon operating closes an obvious circuit for relay 602 which in turn disconnects relay 603 from the start conductor and bridges relay 608 to 611 inclusive across the conductors of trunk 800, which trunk extends to the outgoing distributing point shown in Fig. 8. Relay 603 upon deenergizing, opens the circuit of relay 604 which in turn opens the initial energizing circuit of relay 605, but relay 605 is held operated over the inner lower front contacts of relay 606 to ground on the start conductor 507. The purpose of the relay combination 603, 604, 605, 606 is to prevent a false starting signal from being given by a momentary operation of relays 501 and 502 which might be caused, due to line surges when disconnection takes place.

If the trunk circuit 800 is in working condition, relays 609 and 610 operate in series with relays 801 and 802 at the outgoing distributing center, in a circuit extending from battery through the lower windings of relays 801 and 802, the lower back contact of relay 803, the lower left winding of repeating coil 804, lower contacts of jack 821, trunk conductor 805, contacts 612 of switch 650, the lower right winding of repeating coil 613, front contact of relay 602, windings of relays 608 to 611 inclusive, upper right winding of coil 613, contacts 614 of switch 650, trunk conductor 806, upper contacts of jack 821, upper left winding of coil 804, upper back contact of relay 803 to ground through the upper windings of relays 802 and 801. Relays 608 and 611 being polarized oppositely to relays 609 and 610, do not operate at this time. Relays 801 and 802 also operate for a purpose to be described later. Relays 609 and 610 upon operating close an obvious circuit for relay 615 which at its upper back contact opens an operating circuit for relay 616.

*Operation of line-in-trouble alarm*

If a trouble condition exists on the trunk 800 and consequently relays 609 and 610 do not operate, a circuit is established from ground over the upper back contacts of relays 615 and 617, lower front contact of relay 606 to battery through the winding of relay 616. Relay 616 operates, causing slow-to-operate relay 618 and relays 619 and 620 to operate in turn. Relay 619 connects holding ground to the winding of relay 606 to hold it operated until the trouble condition is removed, and relay 620 grounds conductors extending to the alarm board shown diagrammatically by the rectangle 621. This alarm board may comprise suitable lamps and signal devices as desired for indicating to a maintenance man that a trouble condition exists on the trunk line. In response to the alarm signals the maintenance man depresses the key 622 thus releasing relay 620 which opens the circuit of the alarm signals and establishes over the upper contact of key 622 a circuit for a guard lamp 668 at the alarm board. When the trouble condition is removed, relay 616 releases through the operation of relay 615 or relay 617, in turn releasing relays 618 and 619. Relay 620 reoperates from ground at the back contact of relay 618 over the lower alternate contacts of key 622 causing the alarm signals to reoperate. Since the guard lamp 668 is at the time lighted, the reoperation of the alarm signals indicates to the maintenance man that the trouble has been cleared, whereupon he releases key 622, extinguishing the guard lamp, releasing relay 620 which in turn opens the circuit of the alarm signals.

*Extension of start circuit to central bureau*

It will now be assumed that the operator is on duty at the central bureau and has plugged her announcing transmitter 901 and headset 902 by plugs 903, 904 and 905 into jacks 906, 907 and 908 of the desk circuit 900 and that consequently relays 909 and 910 are operated, relay 909 being operated over the make spring of jack 906 and relay 910 being operated in a circuit from battery through the upper winding of relay 910, sleeves of jack 906 and plug 903, transmitter 901, tips of plug 903 and jack 906, right windings of repeating coil 911 to ground through the lower winding of relay 910. Relay 910 in turn closes an obvious circuit for relay 912 which in turn closes an obvious circuit for relay 913. Relay 912 upon operating establishes the filament circuit for the repeater 975 extending from battery at the repeater, conductor 967, lower contacts of relay 912, conductor 963, filaments of the vacuum tubes of repeater 975 to ground, thus lighting the filaments in the manner set forth in the application of R. F. Massonneau above referred to.

Relay 913 upon operating closes an obvious circuit for relay 914, prepares at its lowermost contacts a circuit for repeater alarm device 976 and closes a break in the start conductor 807 at its upper contact. If the vacuum tubes of repeater 975 have energized properly and caused the flow of space current, the alarm circuit prepared by relay 913 will not therefore be closed through the operation of relay 913. Relay 914 upon operating closes an obvious circuit for relay 915 and a circuit for relay 917 extending from battery, winding of relay 917, back contact of relay 916 to ground at the upper contacts of relay 914. At its inner lower front contact, relay 915 connects battery to the filaments of the volume indicator 918 which may be of the type disclosed in Patent No. 1,523,827 granted January 20, 1925, to E. L. Nelson, and at its lower contacts closes the filament circuit of the vacuum tubes 1101 and 1102 of the oscillator circuit 1100. This filament circuit may be traced from the filament battery through resistance 1103, the filaments of the tubes in series, resistances 1104 and 1105, conductor 1106, contacts of relay 915, conductor 1107 to the other terminal of the filament battery.

When relays 801 and 802 at the outgoing distributing point, Fig. 8, operate as previously described, a start circuit is established from ground at the contacts of these relays over conductor 807 which is multipled to other start conductors controlled by similar relays 801 and 802 in trunks similar to trunk 800 extending from other intermediate distributing centers, such as is shown in Figs. 5 to 7 inclusive, upper front contact of relay 913, back contact of relay 919 to battery through the winding of relay 920. Relay 920 which is slow to operate in turn establishes an obvious circuit for slow operating relay 921 which in turn operates and connects the winding of relay 922 to the start conductor 807. Relay 922 which is slow to release, in turn closes an obvious circuit for relay 923. Relay 923 connects the start conductor 807 directly to the winding of relay 922, closes an obvious circuit for relay 919 and an obvious circuit for call lamp 924. Lamp 924 lights as a signal to the operator that a call for time of day has been initiated by a calling subscriber. When relay 919 operates it opens the circuit of relay 920 which releases, in turn releasing relay 921. Relay 921 in turn opens the initial operating circuit of relay 922, but relay 922 is now held operated over the upper contacts of relay 923 so that relays 923 and 922 remain operated so long as there is a ground on start conductor 807, indicating that a demand exists somewhere in the area for time of day service. The purpose of the slow-to-operate relays 920 and 921 is to prevent a false signal from being given by reason of a momentary operation of relays 801 and 802 which might be caused, due to line surges when disconnection takes place. The slow-to-release relay 922 is used to hold relay 923 operated over the period when relays 801 and 802 momentarily release when battery and ground are reversed through their windings as will be hereinafter described.

When relay 919 operates, it establishes a circuit from ground over its upper contact, conductor 926, the normal contacts of relay 1000 to battery through the winding of relay 1001. Relay 1001 upon operating prepares a holding circuit for itself and establishes a circuit for relay 1002 extending from battery, winding of relay 1002, back contact of relay 1003, upper back contact of relay 1004 to ground at the lower contact of relay 1001. The operation of relay 1002 connects ground to conductors 1005 and 1006 which extend through back contacts of relay 927 to conductors 928 and 929 extending to the outgoing distributing point and conductor 928 extending thence through the windings of relays 808 to 811 inclusive in parallel to battery. Conductor 928 may also extend through the windings of a second group of four similar relays if the area is large enough to require more trunks outgoing from the central bureau than can be served by the four relays 808 to 811 inclusive. Conductor 929 in a similar manner may be extended through the windings of four or eight additional relays similar to relays 808 to 811 inclusive. It will be noted that relays such as 808 and 810 each serves five outgoing trunks such as 800, and consequently as many as forty trunks may be served, although it is intended that not more than thirty-six working trunks shall be connected at one time to the desk circuit of Fig. 9, the remaining four trunks being held in reserve for emergency purposes.

*Transmission of cut through supervisory signal*

When ground is connected to conductor 928 and relay 808 operates, it establishes a circuit for relay 803 extending from battery, upper winding of relay 803, lower contacts of key 812, inner back contact of relay 813 to ground at the inner front contact of relay 808. Relay 803 upon operating in turn extends operating ground from the front contact of relay 808 over the front contact of relay 803 to battery through the winding of relay 817. Relay 817 upon operating establishes a holding circuit from ground at its lower contact through the lower winding of relay 803. When relay 803 operates, it disconnects the upper windings of relays 801 and 802 and ground from trunk conductor 806 and the lower windings of relays 801 and 802 and battery from trunk conductor 805, and when relay 817 operates, the upper windings of relay 801 and 802 and ground are reconnected to trunk conductor 805 and the lower windings of these relays and battery are reconnected to trunk conductor 806, thus reversing the direction of current flowing over the conductors of trunk 800. In a similar manner relays 808 to 811 inclusive and other relays connected to conductors 928 and 929 cause a current reversal on other trunks similar to trunk 800.

The reversal of current flowing over trunk 800 now causes the release of polarized relays 609 and 610 at the intermediate distributing center and the operation of polarized relays 608 and 611. Relays 608 and 611 upon operating close an obvious circuit for relay 617 which in turn opens the circuit of alarm relay 616 and connects ground to conductors 623 and 624. Conductor 623 extends to battery in parallel through the windings of relay 508 to 511 inclusive and may also extend through the windings of a second group of four similar relays if the area is large enough to require more trunks similar to trunk 500 outgoing from the intermediate distributing center than can be served by the four relays 508 to 511 inclusive. Conductor 624 in a similar manner may extend through the windings of four or eight additional relays similar to relays 508 to 511 inclusive. It will be noted that relays such as 508 and 510 each serves five outgoing trunks such as 500 and consequently as many as forty trunks may be served although it is intended that not more than thirty-six working trunks shall be connected at one time to the trunk, the remaining four trunks being held in reserve for emergency purposes.

When ground is connected to conductor 623 and relay 508 operates, it establishes a circuit for relay 503 extending from battery, upper winding of relay 503, lower contacts of key 512, inner back contact of relay 513 to ground at the inner front contact of relay 508. Relay 503 upon operating in turn extends operating ground from the front contact of relay 508 over the front contact of relay 503 to battery through the winding of relay 517. Relay 517 upon operating establishes a holding circuit from ground at its lower contacts, through the lower winding of relay 503. When relay 503 operates it disconnects the upper windings of relays 501 and 502 and ground from trunk conductor 506 and the lower windings of these relays and battery from trunk conductor 505 and when relay 517 operates, the upper windings of relays 501 and 502 and ground are connected to trunk conductor 505 and the lower windings of these relays and battery are connected to trunk conductor 506, thus causing a reversal of the current flowing over the trunk 500 to the local distributing center.

The reversal of current flowing over trunk 500 now causes the release of polarized relays 304 and 307 and the operation of polarized relays 305 and 306. Relays 304 and 307 upon releasing in turn release relays 311, 312, and 313 which in turn release all relays 314 and 315 which have been operated. Relays 305 and 306 upon operating close obvious circuits for relays 317, 323 and 324. Relay 317 upon operating closes obvious circuits for relays 325 and 326 and relays 323 and 324 also close circuits for other relays similar to relays 325 and 326. Since it is possible to operate four relays similar to relays 325 and 326 over each grounded contact of relays 317, 323 and 324, it is thus possible to operate twenty relays, and since each relay such as 326 is capable when operated, of connecting ground to five conductors such as 222, the operation of polarized relays 305 and 306 may thus control the grounding of one hundred conductors 222 of one hundred trunks 204.

When relay 326 operates to connect ground to conductor 222 with relays 212 and 220 operated as previously described, a connection is extended from ground on conductor 222 through the lower front contacts of relay 220, lower winding of relay 207, upper winding of relay 206 and lower alternate contacts of relay 212 to battery. Relay 206 operates and locks over its lower winding and lower front contact to ground at a contact of relay 211, disconnects the source of tone current 224 from the calling line and opens at its lower back contact the locking circuit of relay 207. Relay 207, however, is held operated in series with relay 206. The operation of relay 206 also closes the talking conductors of trunk 204 through condensers 230 and 231 and resistances 232 and 233 to trunk 300 of the transmission network, thus bridging the calling line A on in parallel with other subscribers who are receiving service at the same time. The calling subscriber can now hear the announcement but disturbances or crosstalk between his line and the network are very largely prevented by condensers 230 and 231 and resistances 232 and 233.

*Operation of clock circuit*

Returning now to the operation which takes place at the central bureau, it will be recalled that relay 1002 operated to transmit supervisory impulses for causing all connected subscriber's lines which have initiated calls for time of day service to be cut through to the transmission network. A further consideration of the clock circuit disclosed in Fig. 10 will now be taken. The central bureau is provided with a master clock disclosed in the dot and dash rectangle 1007 which is synchronized by a district master clock every hour. Impulses sent out by the district master clock operate relay 1008 which connects battery to the synchronizing magnet 1009, thus keeping the master clock 1007 in synchronism with the district master clock. The winding contacts 1010 of the master clock are arranged to close every 60 minutes and to remain closed from six to seven seconds to cause the intermittent operation of the winding magnet 1011. The magnet may also be operated independently by the winding key 1012.

The master clock 1007 is arranged to close a circuit for relay 1013 through normal contacts of jack 1014, switch 1015, clock contacts 1016 to ground. Contacts 1016 close for a period of 0.5 of a second every 7½ seconds and thus operate relay 1013 for 0.5 of a second every 7½ seconds. On the even hour or 15 minutes past the hour, depending on whether the correction of the clock from the district clock is made on the even hour or 15 minutes past the hour, the contacts 1017 close and the contacts 1016 are lifted off the operating cam of the clock, the relay 1013 at that time operating over the hour contacts 1017. Each time that relay 1013 operates, it closes a circuit over the right normal contacts of key 1018 through the winding of magnet 1019 of the electric position clock 1020.

When the time indicated by the position clock 1020 does not agree with the time indicated by the master clock 1007 it may be reset by the operation of key 1018 to its right or stop position or to its left or step position as required. If the position clock is behind the master clock, by operating the key to the step position in which position it does not lock, the clock magnet 1019 will be given an additional impulse over a circuit extending through the magnet winding, right normal contact of key 1018 to ground over the left alternate contact of key 1018 to advance the clock 7½ seconds. As many operations of key 1018 to the left may be made as may be required to properly synchronize the clock 1020 with the master clock 1007. If the position clock is ahead of the master clock, the key 1018 may be operated to its right or locking position, thereby stopping the advance of the position clock until it indicates the correct time. This clock 1020 should read 7½ faster than the master clock. It is in the form of a veedometer and is graduated in quarter-minutes, minutes and hours. When the time is 7½ seconds past the even minute the fractional minute wheel of clock 1020 should read one quarter, and when it is 15 seconds past the minute there should be no indication on the fractional minute wheel. The same applies for the one-half, three-quarters and even minute.

Each time that relay 1013 operates from the master clock circuit in addition to advancing the position clock, it also closes a circuit extending from battery through resistance 1021, winding of relay 1022, lower normal contacts of relay 1004 to ground at the upper contacts of relay 1013, and from battery through resistance 1023, winding of relay 1024, normal contacts of relay 1004 to ground at the upper contacts of relay 1013. Relay 1022 operates, but relay 1024 does not, as it is at the time shunted over its lower back contacts by ground on the upper contact of relay 1013. Relay 1022 upon operating causes relay 1004 to operate over a circuit extending through the winding of relay 1004, front contact of relay 1022 to ground at the back contact of relay 1025. Relay 1004 at its upper back contact opens the circuit of relay 1002 which as will be recalled, was instrumental in causing current reversals at the outgoing and intermediate distributing centers for causing subscribers' lines to be cut through to the network. At its lower alternate contacts, relay 1004 establishes a holding circuit for relay 1022 extending through the winding of relay 1022, alternate contacts of relay 1004 to ground at the back contact of relay 1025.

After 0.5 of a second, relay 1013 releases and opens at its upper contact, the shunt circuit around the winding of relay 1024, whereupon relay 1024 operates over the locking circuit of relay 1022 and closes an obvious circuit for relay 1000, which in turn closes an obvious circuit for relay 1003 and closes a locking circuit for relay 1001 extending over the upper contacts of relay 1001, the upper alternate contacts of relay 1000 to ground on the start conductor 926. Relay 1003 upon operating closes an obvious circuit for relay 1026, opens another point in the circuit of relay 1002 and closes a circuit for announcing the lamp 930, extending over conductor 931, the upper front contacts of relay 1003, the upper front contacts of relay 1004, to ground at the lower contact of relay 1001. The lighting of lamp 930 is a signal to the operator that she should announce into her transmitter 901 the time indicated on the position clock 1020. She may, for example, use the expression "When you hear the tone signal it will be exactly 5¾ minutes after five o'clock". The transmission circuit by means of which the announcement is transmitted to calling subscribers connected to the network will be described hereinafter.

After approximately 7½ seconds, the contacts 1016 again close and relay 1013 operates, causing the clock 1020 to advance 7½ seconds and closing a shunt around the winding of relay 1022 extending from ground at the back contact of relay 1025, alternate contacts of relay 1004, winding of relay 1022, lower front contacts of relay 1024 to ground at the upper contact of relay 1013. Relay 1022 thereupon releases and closes a circuit for relay 1027 extending through the winding of relay 1027, lower front contact of relay 1026, back contacts of relay 1022, upper contacts of relay 1001, upper alternate contacts of relay 1000 to ground on conductor 926. Relay 1022 also connects ground from conductor 926 over the inner front contact of relay 1026, conductor 1028 to battery through the winding of relay 932, thereby operating relay 932, and also opens the circuit of relay 1004 which thereupon releases. The release of relay 1004 opens the circuit of the announcement lamp 930.

With relays 1027 and 932 operated, a tone circuit is established from the oscillator 1100 to the talking conductors of the desk circuit 900 which may be traced from conductor 818, left normal contacts of key 950, upper front contacts of relays 917 and 932, conductor 933, upper contact of relay 1027, left windings of repeating coil 1029, lower contact of relay 1027, conductor 934, lower alternate contacts of relay 932, lower contacts of relay 917, left normal contacts of key 950 to trunk conductor 820. From trunk conductors 818 and 820, this circuit is extended to the calling subscriber's line as will be hereinafter described. Tone current is induced from the oscillator circuit 1100 through the right winding of repeating coil 1029 over conductors 1108 and 1109. The operator is also enabled to hear this tone for checking purposes over a circuit extending from conductor 933, conductor 938, condenser 937, sleeves of jacks 907 and plug 904, headset receiver 902, sleeves of plug 905 and jack 908, condenser 936, conductor 935 and conductor 934.

When relay 1013 releases when contact 1016 of clock 1007 again open after 0.5 of a second, relay 1024 which has been held operated over the lower normal contact of relay 1004 and the upper contact of relay 1013 releases in turn releasing relays 1000, 1003, 1026, 1027 and 932. Relay 1001 will remain operated if a call still exists for time of day service, and with relays 1004 and 1003 released, will again close the circuit of relay 1002 which will perform the function previously described of causing a cut through of any subscribers' lines which may have initiated calls during the preceding 7½ seconds. The clock circuit thus functions to cause a cut through signal to be sent out upon the network followed by the lighting of the announcement lamp 930 and then followed by the application of a tone signal from the oscillator 1100 every 15 seconds as long as there are existing calls. The cutting through of the trunks which have waiting calls occurs approximately 0.5 of a second before the announcement lamp 930 at the desk is lighted.

At the beginning of the announcement period, relay 1000 is operated as previously described. In the event that there is no call waiting at this time, relay 1001 will not be operated, and consequently ground will not be connected to light the announcement lamp 930. If a call waiting condition arises after relay 1000 operates, ground is connected to conductor 926, but relay 1001 cannot then operate as it is disconnected from conductor 926 at the uppermost contact of relay 1000. After the announcement period, relay 1000 releases as previously described, causing relay 1002 to operate. At the beginning of the next 7½ seconds before the succeeding quarter of a minute, the lamp 930 will light as previously described. This arrangement insures that the announcement lamp will always be lighted at the beginning of the announcement period in order to give sufficient time to make a complete announcement. When there is no call waiting and therefore no ground on conductor 926, relays 1013, 1022, 1024, 1004, 1000, 1003 and 1026 operate in the manner previously described, but relays 1001, 1002, 1027 and 932 do not operate.

In order to have the clock circuit of Fig. 10 synchronized to indicate the start of the announcement period to the operator 7½ seconds before the quarter minute periods, it is necessary to operate relay 1022 with relay 1024 short-circuited. This condition may be obtained without disturbing the position clock 1020, by operating the key 1018 to the right and then releasing it to normal during the first half of any quarter of a minute as read on the second hand of the master clock 1007 or during the period the second hand is passing over a white segment of the second hand dial. When key 1018 is thus operated, relay 1025 operates and removes the operating ground from relay 1004. When the key is restored, relay 1025 releases.

*Operation of repeater at local distributing center*

It will be assumed that the switch 350 at the local distributing center, the switch 650 at the intermediate distributing center and key 950 at the desk circuit are all in their normal positions. With switch 350 normal, filament battery is connected to the filaments of the tubes of repeater 375 from battery at the repeater over conductor 349, normal contacts 327 of switch 350, conductor 343, through the tube filaments to ground in the manner described in the application of R. F. Massonneau hereinbefore referred to. If the tubes are properly energized and emit space current, a plate circuit relay (not shown) in the repeater will operate. If, however, the filaments do not light or the tubes do not emit space current, this relay will not operate, and a circuit is therefore closed from ground at the back contact of this relay over conductor 344, contacts 328 of switch 350, upper normal contacts of jack 329 to battery through the winding of slow-to-operate relay 330, and through resistance 333 and the inner normal contacts of jack 329 through the winding of slow-to-release relay 334. Relay 334 operates first and removes a short circuit from relay 335 extending from battery through the winding of relay 335, lower normal contacts of jack 329 to battery at the back contact of relay 334, thus permitting relay 335 to operate over the lower normal contacts of jack 329, resistance 336 to grounded conductor 344. Relay 335 upon operating opens the operating circuit of relay 332. When relay 330 operates it causes the operation of relay 331 which is also a slow-to-operate relay. As soon as relay 331 operates it closes a short circuit around the winding of slow-to-release relay 334 which after an interval releases, again short-circuiting relay 335 causing it to release. With relay 335 released and relay 331 operated, relay 332 operates and causes the operation of relay 302 and the closure of circuits for alarm signals on the alarm board 321. The operation of relay 302 opens the start circuit extending to the winding of relay 303, whereupon if calls come into the local distributing center they will not be extended until the trouble condition is removed. Relay 302 also closes the circuit of trouble lamp (not shown) on the repeater panel over conductor 346. The group of slow-to-operate and slow-releasing relays 330, 331, 334 and 335, provides a sufficient delay before the operation of alarm signals to permit the tubes of the repeater 375 to become heated up when the repeater is placed into service.

If the trouble lamp lights, the maintenance man by throwing switch 350 to the right can remove the circuits of Fig. 3 from service. He then throws switch 450 of the emergency equipment, Fig. 4, to the left. A repeater similar to repeater 375 and supervisory and alarm equipment similar to that shown in Fig. 3 which is diagrammatically indicated in Fig. 4 by the rectangle 400, is then inserted between trunk 300 and trunk 500. In this connection it should be noted that switches 350 and 450 should not be operated in the same direction at one time. If both switches should through error be in the position in which switch 350 is shown, that is, thrown to the left, a circuit would be established from battery, winding of relay 337, contacts 438 of switch 450, conductor 339, contacts 338 of switch 350 to ground. Relay 337 will then operate closing alarm signals at the alarm board 321. Similarly if both switches 350 and 450 should be thrown to the right, the circuit of relay 337 will be completed from battery through the winding of relay 337, contacts 440 of switch 450, conductor 341, contacts 340 of switch 350 to ground. The maintenance man, noting the alarm signals will then throw the keys properly so that one, and only one, repeater circuit will be in service.

Operation of repeater at intermediate distributing center

With switch 650 normal or in the position shown, filament battery is connected to the filaments of the tubes of repeater 675 from battery at the repeater over conductor 666, normal contacts 627 of switch 650, conductor 654, through the tube filaments to ground in the manner described in the application of R. F. Massonneau hereinbefore referred to. If the tubes are properly energized and emit space current, a plate circuit relay (not shown) in the repeater will operate. If however, the filaments do not light or the tubes fail to emit space current, this relay will not operate and ground will therefore be connected to conductor 653, thereby causing the operation of relays 630, 631, 632, 634, 635 and 607, the lighting of a trouble lamp (not shown) on the repeater panel 675 and the operation of alarm signals on the alarm board 621 in exactly the same manner as previously described in connection with the similar circuits of Fig. 3. Alarm signals are also operated on the alarm board 621 through the operation of relay 637 in the manner previously described in connection with the circuits of Figs. 3 and 4 should both switches 650 and 750 be both operated at the same time either to the left or to the right.

Transmission of announcement of time

Assuming that at the time the central bureau operator makes a time announcement in response to the lighting of announcement lamp 930, the repeater circuits of Figs. 3, 6 and 9 are functioning properly and have been placed in service through the proper operation of keys 350, 650 and 950 as previously described, voice current will be transmitted from the announcing transmitter 901 over tips of plug 903 and jack 906, right windings of repeating coil 911, condenser 939, rings of jack 906 and plug 903 to the transmitter, the transmitter being supplied with current through the windings of relay 910. Induced current will then flow from the left windings of repeating coil 911, upper back contact of relay 940, upper back contact of relay 941, padding resistances 942, upper back contact of relays 943 and 944, left windings of the input transformer of repeater 975, lower back contact of relays 944 and 943, padding resistances 946, back contacts of relays 941 and 940 to the left windings of repeating coil 911. The induced current is then amplified in the well known manner by tubes of repeater 975 and impressed by the output transformer of repeater 975 upon a loop circuit over the lower normal contacts of relay 932, lower contact of relay 917, lower left normal contacts of key 950, conductor 820, normal contacts of key 812 through the right windings of repeating coil 804, upper normal contacts of key 812, conductor 818, upper normal contacts of key 950, upper contact of relay 917, upper normal contact of relay 932, to the output transformer.

Current flowing through the right windings of repeating coil 804 induces current in a loop circuit extending over trunk 800 which may be traced from the upper left winding of repeating coil 804, upper contacts of jack 821, conductor 806, switch contacts 614, upper right winding of repeating coil 613, condenser 641, front contact of relay 602, lower right winding of repeating coil 613, switch contacts 612, conductor 805, lower contacts of jack 821, lower left winding of repeating coil 804, lower back contact of relay 803, condenser 822, upper back contact of relay 803, to the upper left winding of repeating coil 804. Current flowing in this loop is again induced into the input transformer of repeater 675 and is now amplified by the tubes of repeater 675 and is impressed by the output transformer of repeater 675, over conductor 651, switch contacts 642, tip trunk conductor, upper contacts of key 512, right windings of repeating coil 504, middle contacts of key 512, ring trunk conductor, switch contacts 645, conductor 652 to the output transformer of repeater 675.

Current is again impressed by repeating coil 504 upon a loop circuit extending from the upper left terminal of repeating coil 504, upper contacts of jack 521, trunk conductor 506, switch contacts 310, upper right winding of repeating coil 309, condenser 351, upper contact of relay 303, lower right winding of repeating coil 309, switch contacts 308, trunk conductor 505, lower contacts of jack 521, lower left winding of repeating coil 504, lower back contact of relay 503, condenser 522, upper back contact of relay 503, to the upper left winding of repeating coil 504. The current thus impressed on the right windings of repeating coil 309 is in turn impressed over the left windings of coil 309, and the windings of the input transformer of repeater 375. Repeater 375 amplifies the current thus impressed on the input transformer thereof and through the output transformer thereof impresses it over a loop circuit extending from the windings of the output transformer over conductor 347, switch contacts 342, resistance 232, upper contact of relay 206, condenser 230, tip brushes of selectors 145 and 102, right windings of repeating coil 144 thence over ring brushes of selectors 102 and 145, condenser 231, inner upper front contact of relay 206, resistance 233, switch contacts 345, conductor 348 to the windings of the output transformer of repeater 375. The calling subscriber on line A is enabled to hear the announcement made by the operator by current induced upon his line over the left windings of repeating coil 144.

At the same time, other subscribers' lines which may at the same time be connected to the network also receive the announcement over branches of the circuits above traced extending from conductors 818 and 820 at the outgoing distributing point, Fig. 8, from the conductors of trunk 500 at the intermediate distributing center, Fig. 5, and from conductors of trunk 300 at the local distributing center, Fig. 3.

After the announcement has been made by the central bureau operator and relay 932 has operated as previously described, a tone signal is applied over the network from the oscillator 1100 of Fig. 11 in the manner just described for the transmission of voice current.

Immediately following the completion of the announcement period, current flowing over the loop supervisory circuits of the trunk network is again reversed by the clock circuit so that relay 326 at the local distributing center releases following the release of relay 1002 at the clock circuits and opens the operating circuit of relays 206 and 207. Relay 206 remains locked but relay 207 releases. Relay 207 upon releasing reverses the direction of current flowing through supervisory relay 122 and releases relay 220. The purpose of reversing the current at this time is to prevent the calling subscriber from being charged for more than one call. The calling subscriber may now listen to more than one time announcement if he so desires.

*Restoration of connection*

When the calling subscriber hangs his receiver upon the switchhook, the district and office selectors 102 and 145 and line finder 101 release in the well known manner, the office selector removing ground at cam 143 from sleeve conductor 208 thereby releasing relay 211. Relay 211 in turn releases relays 212 and 206 and removes ground from start conductor 221. If there are no other calling subscribers' lines at the time connected to the local distributing point, start relay 303 thereat will release, thereby releasing relays 501 and 502 which in turn release opening start conductor 507. If there are no other calls at the time incoming to the intermediate distributing center, relay 605 thereat will release, in turn releasing relays 606 and 602. Relay 602 in turn releases relays 801 and 802 which remove starting ground from conductor 807, thereby releasing relays 922, 923 and 919 at the desk circuit to remove starting ground from conductor 926 and to extinguish the call waiting lamp 924.

*Alternate distributing circuits*

In the previous description it has been pointed out that repeaters 375 and 675 at the local and intermediate distributing centers may, if defective, be removed from service by the operation of switches 350 and 650 and substitute repeaters 400 and 700 placed into service by the operation of switches 450 and 750. A further safeguard against circuit failure is also provided at the intermediate distributing center whereby a group 523 of supervisory distributing relays, Fig. 5, may be cut out of service and a similar group of relays 527 substituted therefor. Relays corresponding to relays 508 to 511 inclusive and 513 to 516 inclusive of group 523 are not disclosed in detail in Fig. 5 but have been indicated by the rectangle 527. If the maintenance man for example, should find it necessary to remove relays 508 to 511 inclusive, from service he will operate key 524, thus operating relays 513 to 516 inclusive, thereby rendering relays 508 to 511 ineffective to control reversing relays such as 503 of trunk 500 outgoing from the intermediate distributing center to local distributing centers. With key 524 operated, a circuit is established from ground over the right contact of this key, conductor 647, contacts 646 of switch 650 to battery through the winding of relay 637. Relay 637 thereupon operates to close circuits for alarm signals on the board 621 to indicate that the switch 650 should be operated to the right and that switch 750 should be operated to the left to cut the repeater circuit 675 out of service and to cut the repeater circuit 700 into service.

Similarly, if the circuits of Fig. 7 and the reserve group 527 of relays of Fig. 5 are in service and the reserve relays develop trouble and the maintenance man desires to remove them from service and place the circuits of Fig. 6 and the group of relays 523 shown in Fig. 5 into service, he should throw switch 650 to the left, throw switch 750 to the position shown in Fig. 7 and operate key 525, Fig. 5. Key 525 operates relays similar to relays 513 to 516 inclusive of group 527 to render the relays corresponding to 508 to 511 ineffective and at its right contacts connects ground to conductor 747. If switch 750 has not been restored to the left as it should be in this case, a circuit is extended from ground on conductor 747 over the left contacts 746 of switch 750, conductor 648 through the winding of relay 637 thus operating the alarm signals.

The supervisory relays such as 808 to 811 inclusive of group 823, Fig. 8, if troubles develop therein, may be removed from service by the operation of key 824 which operates relays 813 to 816 inclusive to render these relays ineffective and a reserve group 827 of similar relays indicated by the rectangle 827 may then be substituted therefor. Key 824 when operated also establishes a circuit over conductor 826, the back contact of relay 947 to battery through the winding of relay 948. Relay 948 operates and lights out-of-service lamp 949 at the maintenance man's position and out-of-service lamp 951 at the operator's position. Relay 927 is also operated from ground on conductor 826 to open the reversing conductors 928 and 929, thus preventing any calls from being connected to the bureau while the operator is connected to the desk circuit 900 of Fig. 9.

The operator upon noting the lighted lamp 951 withdraws plugs 903, 904 and 905 from the jacks 906, 907 and 908 and connects these plugs with jacks 1206, 1207 and 1208 of the emergency desk circuit shown diagrammatically by the rectangle 1200 of Fig. 12. This causes relays 909 and 910 of the vacated desk circuit to release, relay 910 causing relay 912 to release to open the filament circuit of the associated repeater 975 and to release relay 913. Relay 913 upon releasing, releases relay 914, opens the alarm conductor extending from repeater 975 to the alarm 976 and causes relays 922, 923 and 919 to release in turn. The release of relay 914 opens the circuits of relays 917 and 915 which also release. The release of relay 915 opens the filament circuits of the volume indicator 918 and of the oscillator 1100. With the release of relay 923, the calling lamp 924 is extinguished and starting ground is removed from conductor 926 extending to the clock circuit of Fig. 10. When the operator plugs into the jacks 1206, 1207 and 1208 of the alternate desk circuit 1200, this desk circuit including an associated clock circuit, repeater circuit, oscillator and volume indicator, and repeater alarm circuit, function as previously described in connection with Figs. 9 to 11 inclusive.

The maintenance man upon observing the out-of-service lamp 949 lighted, operates key 950 to the left, thus disconnecting the talking conductors of the desk circuit 900 from the trunk conductors 818 and 820. With key 950 thrown to the left, obvious circuits are closed for relay 947 and relay 953 causing these relays to operate. Relay 947 opens the circuit of relay 948, thereby extinguishing lamps 949 and 951. The maintenance man then operates key 1250 to the right, connecting the trunk conductors 818 and 820 to the desk circuit 1200. Incoming calls are now directed to the desk circuit 1200 in the same manner as previously described in connection with desk circuit 900. In a similar manner, if desk circuit 1200 is in service with the distributing relay set 827 and trouble arises in the relay set, the key 825 would be operated, performing functions similar to key 824.

*Alternate desk and associated circuits*

In the event that trouble should be encountered in the repeater 975 associated with desk circuit 900 and it fails to emit space current when connected into service and the plate circuit relay of repeater 975 does not operate, a circuit is established from ground at the back contact of this relay, conductor 964, lower contact of relay 913, to relays in the alarm circuit 976 in the manner described in the application of R. F. Massonneau hereinbefore referred to. After a predetermined interval if the trouble condition continues in the repeater 975, alarm signals are operated, a circuit is established over conductor 965 for lighting a trouble lamp on the repeater panel and ground is connected to conductor 966 for operating relays 927 and 948 at the associated desk circuit 900.

At the desk circuit 900 upon the operation of relay 927, the supervisory reversing conductors 928 and 929 are opened to prevent any subscribers' lines from being cut through to the central bureau, and upon the operation of relay 948, the out-of-service lamp 951 is lighted at the operator's position to inform her that she should transfer to the desk circuit 1200 and out-of-service lamp 949 is lighted at the maintenance man's position. The maintenance man upon observing the lighted lamp 949 operates key 950 to the left thus disconnecting the talking conductors of desk circuit 900 from the trunk conductors 818 and 820 and connecting this desk circuit with his test line 952 and operates key 1250 to the right to connect the trunk line with the desk circuit 1200.

With key 950 thrown to the left, obvious circuits are closed for relays 947 and 953, causing these relays to operate. Relay 947 opens the circuit of relay 948, thereby extinguishing lamps 949 and 951 and closes an obvious circuit for relay 954 which in turn closes an obvious circuit for relay 916. Relay 916 locks over the upper contact of relay 954 to ground at the lower right contact of key 950. Relay 916 upon operating opens the circuit of relay 917 at one point, this circuit being further opened at the contact of relay 914 as soon as the operator disconnects from the desk circuit 900. Relay 917, however, reoperates over an obvious circuit closed by relay 953, thus connecting the talking conductors of the desk circuit over its front contacts and the left contacts of key 950 to the test line 952 for testing purposes. Relay 953 also closes a circuit extending from ground at its lower front contact over the upper front contact of relay 947 to battery through the winding of relay 948 for reoperating relay 948 to relight lamps 949 and 951, these lamps now remaining lighted until the key 950 is restored.

The maintenance man may now test the vacated channel under operating conditions by having a spare transmitter plugged into jack 906 and a receiver connected to the test line 952. With the spare transmitter plugged up, relays 909, 910, 912, 913, 914, 915, 920, 921, 922, 923, 919 and 932 function as previously described, and the maintenance man will be able to hear regular announcements made by the operator through the spare transmitter and also receive tones from the oscillator 1100.

After the maintenance man has repaired the trouble, he will restore the key 950 to normal. When key 950 is restored, relay 953 releases, but relay 947 is held operated over a circuit extending over the upper contacts of relay 954 to ground at the upper contact of relay 914. Relay 947 holds relays 954 and 927 operated. When relay 953 releases, relay 917 releases, since at this time relay 916 is operated, and at its lower back contact connects interrupted ground from interrupter 955 over the upper front contact of relay 947 through the winding of relay 948. Relay 948 is now intermittently operated to flash out-of-service lamps 949 and 951. The operator noting the flashing of lamp 951 will disconnect the spare transmitter from jack 903, thus releasing relays 909 and 910, which in turn cause the release of relays 912, 913, 914, 915, 922, 923 and 919. Relay 914 upon releasing releases relay 947 which in turn releases relay 948, and extinguishes lamps 949 and 951 and releases relays 954 and 916. The extinguishing of lamp 951 is a signal to the operator that the associated channel is operative. The desk circuit of Fig. 12 may in a similar manner be removed from service and connected to test line 1252 for testing purposes.

*Desk circuit alarm*

Should the desk circuits be both vacated and a call be incoming, ground on conductor 807 is extended over the normal contacts of jacks 907 and 908, conductor 956, normal contacts of jacks 1207 and 1208 to the winding of relay 1257. Relay 1257 operates, closing a circuit for audible signal 1258. Should the transmitter plug 903 be inserted in jack 906 of desk circuit 900 and the receiver plugs 904 and 905 be inserted in jacks 1207 and 1208 of desk circuit 1200 or vice versa and a call be incoming, ground on conductor 807 is extended over normal contacts of jacks 907 and 908, and conductor 956, back contact of relay 1209 to battery through the winding of relay 1257, thus operating the audible signal 1258. It is to be noted that if the transmitter plug 903 and receiver plugs 904 and 905 are inserted into the jacks of the same desk circuit, that no circuit is possible for relay 1257.

*Transmission circuit padding*

In the previous description, reference was made to the padding resistances 942 and 946 in the operator's transmission circuit. Padding resistances are provided for the purpose of controlling the volume of transmission from the operator's transmitter 901 in accordance with the strength of operators' voices. When an operator who has a voice of average strength is making the announcement, the volume control key 961 is in the normal position and the volume padding resistances 942, 946 and 957 are effective as previously described. If, however, an operator has a weak voice, the key 961 is operated to the left, thus operating relays 940 and 944 to remove the padding resistances altogether. If the operator has a voice strength greater than the average, key 961 is operated to the right, thus operating relays 941 and 943 to substitute padding resistances 958, 959 and 960 for resistances 942, 946 and 957. The reading of the volume indicator galvanometer 962 is used in determining the proper position of the volume control key 961 for different operators who may announce the time of day.

What is claimed is:

1. In a telephone system, a central bureau desk circuit, a plurality of distributing centers, a plurality of trunks multipled to said desk circuit and extending to said distributing centers, a supervisory circuit extending over each of said trunks, means in each trunk at the outgoing end thereof to reverse current flowing in the supervisory circuit thereof, and means common to said trunks controlled from said desk circuit for simultaneously operating the reversing means of said trunks.

2. In a telephone system, a trunk circuit, a plurality of distributing centers, a plurality of trunks multipled to said trunk circuit and extending to said distributing centers, a supervisory circuit extending over each of said trunks, a first and a second relay and a source of current in each trunk at the outgoing end thereof, and means common to said trunks controlled from said trunk circuit for simultaneously operating the first relay of each trunk to open the supervisory circuit of each corresponding trunk and to thereafter operate the second relay of each trunk to reverse the current from said source over the supervisory circuit of such trunk.

3. In a telephone system, a central bureau desk circuit, a plurality of distributing centers, a plurality of groups of trunks, said trunks all being multipled to said desk circuit and extending to said distributing centers, a supervisory circuit extending over each of said trunks, means in each trunk at the outgoing end thereof to reverse current flowing in the supervisory circuit thereof, a relay individual to each group of said trunks for simultaneously operating the reversing means of the corresponding group of trunks, and means in said desk circuit for simultaneously operating said relays.

4. In a telephone system, a first distributing center, a plurality of second distributing centers, a plurality of trunks multipled together at said first distributing center, and extending to said second distributing centers, a supervisory circuit extending over each of said trunks, means in each trunk at the outgoing end thereof to reverse current flowing in the supervisory circuits thereof, and means common to said trunks controlled from said first distributing center for simultaneously operating the reversing means of said trunks.

5. In a telephone system, a first distributing center, a plurality of second distributing centers, a plurality of groups of trunks, said trunks all being multipled together at said first distributing center and extending to said second distributing centers, a supervisory circuit extending over each of said trunks, means in each trunk at the outgoing end thereof to reverse current flowing in the supervisory circuit thereof, a relay individual to each group of said trunks for simultaneously operating the reversing means of the corresponding group of trunks, and means for simultaneously operating said relays.

6. In a telephone system, a trunk circuit, a plurality of distributing centers, a plurality of trunks multipled to said trunk circuit and extending to said distributing centers, a supervisory circuit extending over each of said trunks, means in each trunk at the outgoing end thereof to reverse current flowing in the supervisory circuit thereof, relay means common to said trunks for simultaneously operating the reversing means of said trunks, a duplicate relay means common to said trunks for simultaneously operating the reversing means and keys for rendering either relay means ineffective.

7. In a telephone system, a central bureau having desk circuits in duplicate, a plurality of distributing centers, a plurality of trunks extending to said distributing centers, means for multipling said trunks to either of said desk circuits, a supervisory circuit extending over each of said trunks, means in each trunk at the outgoing end thereof to reverse current flowing in the supervisory circuit thereof, duplicate means common to said trunks controllable respectively from said desk circuits for simultaneously operating the reversing means, a key for removing one of said common means from the control of one of said desk circuits, and a key for removing the other of said common means from the control of the other of said desk circuits.

8. In a telephone system, a first distributing center having circuits in duplicate, a plurality of second distributing centers, a plurality of trunks extending to said second distributing center, means for multipling said trunks to either circuit at said first distributing center, a supervisory circuit extending over each of said trunks, means in each trunk at the outgoing end thereof to reverse current flowing in the supervisory circuit thereof, duplicate means common to said trunks controlled respectively from said circuits at the first distributing center for simultaneously operating the reversing means, a key for removing one of the common means from the control of one of said circuits, and a key for removing the other of said common means from the control of the other of said circuits.

9. In a telephone system, a central bureau having desk circuits in duplicate, a plurality of distributing centers, a plurality of trunks extending to said distributing centers, means for multipling said trunks to either of said desk circuits, supervisory circuits extending over each of said trunks, means in each trunk at the outgoing end thereof to reverse current flowing in the supervisory circuit thereof, duplicate means common to said trunks controllable respectively from said desk circuits for simultaneously operating the reversing means, a key individual to one of said common means for removing it from the control of one of said desk circuits, a key individual to the other of said common means for removing it from the control of the other of said desk circuits, and a signaling means at each desk circuit operable when that key has been operated which removes the corresponding common means from the control of that particular desk circuit.

10. In a telephone system, a first distributing center having circuits in duplicate, a switch associated with each circuit for removing said circuit from service, a plurality of second distributing centers, a plurality of trunks extending to said second distributing centers and multipled to each of said circuits, a supervisory circuit extending over each of said trunks, means in each trunk at the outgoing end thereof to reverse current flowing in the supervisory circuit thereof, duplicate means common to said trunks controllable respectively from said circuits for simultaneously operating the reversing means, a key individual to one of said common means and to the corresponding circuit for removing such common means from the control of the corresponding circuit, a key individual to the other of said common means and to the corresponding circuit for removing such common means from the control of the other of said circuits, a signal device common to said circuits, and means for operating said signaling device upon the operation of either of said keys if the switch of the circuit to which the key is individual is not so operated as to remove that circuit from service.

11. In a telephone system, a trunk, a supervisory circuit extending over said trunk, a relay in said trunk at one end thereof responsive to the completion of the supervisory circuit thereover, an alarm, means for operating said alarm if said relay does not operate within a predetermined period, a guard signal, a control key for operating said guard signal and for stopping said alarm, and means for thereafter reoperating said alarm under the control of said relay if said supervisory circuit becomes completed while said key is operated.

12. In a telephone system, a trunk, a supervisory circuit extending over said trunk having a line relay and source of current at the distant end thereof and a pair of oppositely polarized relays at the near end thereof, means for closing said supervisory circuit at the near end thereof whereby if said supervisory circuit is in standard condition a first of said polarized relays will operate, means at the distant end of said supervisory circuit for reversing the current flowing thereover to release said first polarized relay and to operate the second polarized relay, an alarm signal, means for operating said alarm signal after a predetermined period if neither of said polarized relays is operated, a guard signal, a control key for operating said guard signal and for stopping said alarm signal, and means operative thereafter upon the operation of either of said polarized relays for reoperating said alarm signal if said supervisory circuit is rendered operative while said key is operated.

13. In a telephone system, a trunk circuit, a repeater and supervisory apparatus, a first switch for inserting said repeater and supervisory apparatus into said trunk circuit, a duplicate repeater and supervisory apparatus, a second switch for inserting said duplicate repeater and supervisory apparatus into said trunk circuit, an alarm device, and means for operating said alarm device if said switches are both operated to connect their respective repeaters and supervisory apparatus into said trunk circuit.

14. In a telephone system, a trunk circuit, a repeater and supervisory apparatus, a first switch for inserting said repeater and supervisory apparatus into said trunk circuit, a duplicate repeater and supervisory apparatus, a second switch for inserting said duplicate repeater and supervisory apparatus into said trunk circuit, an alarm device, and means for operating said alarm device if said switches are both operated to remove their respective repeaters and supervisory apparatus from connection with said trunk circuit.

15. In a telephone system, a central bureau having a telephone transmitter, a local office having trunk circuits outgoing therefrom and calling lines terminating therein, means for connecting said calling lines with idle trunk circuits, a trunk network extending to said central bureau and multipled to said trunk circuits, a supervisory circuit extending over said trunk network comprising a source of current at the central bureau end of said network and a pair of oppositely polarized relays at the office end of said network, means in said trunk circuits for closing said supervisory circuit upon the seizure of any of said trunk circuits to thereby operate a first of said polarized relays, a plurality of parallelly connected relays controlled through the operation of said first polarized relay, a pickup relay in each of said trunk circuits, each of said plurality of relays controlling a plurality of said pickup relays, means at said central bureau for reversing the current in said supervisory circuit for thereby operating said second polarized relay, a second plurality of parallelly connected relays controlled through the operation of said second polarized relay, a cut-through relay in each of said trunk circuits, each of said second plurality of relays controlling a plurality of said cut-through relays through contacts of the corresponding pickup relays, and means controlled by said cut-through relays for establishing talking circuits from said transmitter to said calling lines.

16. In a telephone system, a central bureau having a telephone transmitter, local offices having trunk circuits outgoing therefrom and calling lines terminating therein, means for connecting the calling lines of an office with the trunk circuits outgoing therefrom, a trunk network extending to said central bureau and multipled to said trunk circuits, a supervisory circuit extending over said trunk network comprising a source of current at the central bureau end of said network and a pair of oppositely polarized relays at the office end of said network, means in said trunk circuits for closing said supervisory circuit upon the seizure of any of said trunk circuits to thereby operate a first of said polarized relays, a plurality of parallelly connected relays controlled through the operation of said first polarized relay, a pickup relay in each of said trunk circuits, each of said plurality of relays controlling a plurality of said pickup relays, means at said central bureau for reversing the current in said supervisory circuit for thereby operating said second polarized relay, a second plurality of parallelly connected relays controlled through the operation of said second polarized relay, a cut-through relay in each of said trunk circuits, each of said second plurality of relays controlling a plurality of said cut-through relays through contacts of the corresponding pickup relays, and means controlled by said cut-through relays for establishing talking circuits from said transmitter to said calling lines.

In witness whereof, I hereunto subscribe my name, this 5th day of January, 1931.

HORATIO G. W. BROWN.